(12) United States Patent
Huang et al.

(10) Patent No.: US 12,348,704 B2
(45) Date of Patent: *Jul. 1, 2025

(54) DISPLAYS WITH VIEWER TRACKING

(71) Applicant: Apple Inc., Cupertino, CA (US)

(72) Inventors: Yi-Pai Huang, Zhubei (TW); Felipe Bacim De Araujo E Silva, San Jose, CA (US); Ping-Yen Chou, Santa Clara, CA (US); ByoungSuk Kim, Palo Alto, CA (US); Chaohao Wang, Shanghai (CN); Yi Huang, San Jose, CA (US); Michael J. Rockwell, Palo Alto, CA (US); Seung Wook Kim, San Jose, CA (US); Pretesh A. Mascarenhas, San Jose, CA (US)

( * ) Notice: Subject to any disclaimer, the term of this patent is extended or adjusted under 35 U.S.C. 154(b) by 110 days.

This patent is subject to a terminal disclaimer.

(21) Appl. No.: 18/355,774

(22) Filed: Jul. 20, 2023

(65) Prior Publication Data

US 2024/0022705 A1 Jan. 18, 2024

Related U.S. Application Data

(63) Continuation of application No. 17/231,941, filed on Apr. 15, 2021, now Pat. No. 11,750,795.

(Continued)

(51) Int. Cl.
*H04N 13/383* (2018.01)
*H04N 13/133* (2018.01)
(Continued)

(52) U.S. Cl.
CPC ......... *H04N 13/383* (2018.05); *H04N 13/133* (2018.05); *H04N 13/305* (2018.05); *H04N 13/368* (2018.05)

(58) Field of Classification Search
CPC .. H04N 13/133; H04N 13/305; H04N 13/366; H04N 13/368; H04N 13/383; H04N 13/398
(Continued)

(56) References Cited

U.S. PATENT DOCUMENTS

| 5,777,720 A | 7/1998 | Shapiro et al. |
| 7,425,069 B2 | 9/2008 | Schwerdtner et al. |

(Continued)

FOREIGN PATENT DOCUMENTS

| JP | H0678342 A | 3/1994 |
| JP | H11212024 A | 8/1999 |

(Continued)

*Primary Examiner* — Behrooz M Senfi
(74) *Attorney, Agent, or Firm* — Treyz Law Group, P.C.; Joseph F. Guihan; Jinie M. Guihan

(57) ABSTRACT

An electronic device may include a lenticular display. The lenticular display may have a lenticular lens film formed over an array of pixels. The lenticular lenses may be configured to enable stereoscopic viewing of the display such that a viewer perceives three-dimensional images. The display may have a number of independently controllable viewing zones. A eye and/or head tracking system may use a camera to capture images of a viewer of the display. Control circuitry in the electronic device may use the captured images from the eye and/or head tracking system to determine which viewing zones are occupied by the viewer's eyes. The control circuitry may disable or dim viewing zones that are not occupied by the viewer's eyes in order to conserve power. An unoccupied viewing zone and an adjacent, occupied viewing zone may display the same image to increase sharpness in the display.

20 Claims, 18 Drawing Sheets

Related U.S. Application Data

(60) Provisional application No. 63/023,479, filed on May 12, 2020.

(51) Int. Cl.
*H04N 13/305* (2018.01)
*H04N 13/368* (2018.01)

(58) Field of Classification Search
USPC .......................................................... 348/59
See application file for complete search history.

(56) References Cited

U.S. PATENT DOCUMENTS

| | | | |
|---|---|---|---|
| 8,339,333 | B2 | 12/2012 | Casner et al. |
| 9,361,727 | B2 | 6/2016 | Fuchs et al. |
| 9,429,764 | B2 | 8/2016 | Harrold et al. |
| 9,667,952 | B2 | 5/2017 | Itoh |
| 9,927,623 | B2 | 3/2018 | Johnson et al. |
| 9,946,076 | B2 | 4/2018 | Smits et al. |
| 10,116,914 | B2 | 10/2018 | Woods |
| 10,853,625 | B2 | 12/2020 | McCombe et al. |
| 11,750,795 | B2 * | 9/2023 | Huang ................ H04N 13/133 348/59 |
| 2009/0123030 | A1 | 5/2009 | De La Barre et al. |
| 2009/0168164 | A1 | 7/2009 | Kean et al. |
| 2011/0032346 | A1 | 2/2011 | Kleinberger |
| 2012/0068913 | A1 | 3/2012 | Bar-Zeev et al. |
| 2013/0257928 | A1 | 10/2013 | Lee |
| 2013/0321406 | A1 * | 12/2013 | Harrold ................ G02B 6/0038 345/419 |
| 2014/0029093 | A1 | 1/2014 | Lee et al. |
| 2014/0192146 | A1 | 7/2014 | Park et al. |
| 2015/0015668 | A1 | 1/2015 | Bennett et al. |
| 2015/0029317 | A1 | 1/2015 | Kim et al. |
| 2015/0077526 | A1 | 3/2015 | Kim et al. |
| 2015/0237334 | A1 * | 8/2015 | Murao ................ H04N 13/371 348/59 |
| 2016/0077348 | A1 | 3/2016 | Kang |
| 2016/0266398 | A1 | 9/2016 | Poon et al. |
| 2016/0349523 | A1 | 12/2016 | Wei |
| 2017/0148250 | A1 | 5/2017 | Angermayer et al. |
| 2018/0152695 | A1 | 5/2018 | Jin |
| 2018/0307310 | A1 | 10/2018 | McCombe et al. |
| 2019/0377177 | A1 | 12/2019 | Takahashi et al. |
| 2020/0211507 | A1 | 7/2020 | Clarke et al. |
| 2021/0116729 | A1 | 4/2021 | Maeda et al. |
| 2021/0297653 | A1 | 9/2021 | Huang et al. |
| 2022/0199588 | A1 | 6/2022 | Lu et al. |

FOREIGN PATENT DOCUMENTS

| | | | |
|---|---|---|---|
| JP | H11285029 A | 10/1999 | |
| JP | 2006171728 A | 6/2006 | |
| JP | 2010273013 A | 12/2010 | |
| JP | 2014112147 A | 6/2014 | |
| JP | 2019054513 A | 4/2019 | |
| KR | 20140146486 A | 12/2014 | |
| WO | WO-2012136386 A1 * | 10/2012 | ............ G09F 19/14 |
| WO | 2014050819 A1 | 4/2014 | |
| WO | 2018142610 A1 | 8/2018 | |
| WO | WO-2020257307 A1 * | 12/2020 | ............ G02B 27/30 |
| WO | 2021087450 A1 | 5/2021 | |

* cited by examiner

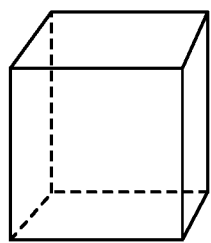  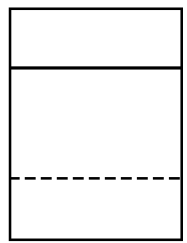  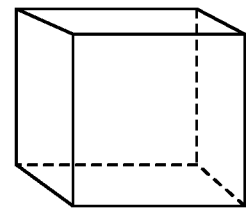
*FIG. 7A*  *FIG. 7B*  *FIG. 7C*

DISPLAYS WITH VIEWER TRACKING

This application is a continuation of non-provisional patent application Ser. No. 17/231,941, filed Apr. 15, 2021, which claims the benefit of provisional patent application No. 63/023,479, filed May 12, 2020, which are hereby incorporated by reference herein in their entireties.

FIELD

This relates generally to electronic devices, and, more particularly, to electronic devices with displays.

BACKGROUND

Electronic devices often include displays. In some cases, displays may include lenticular lenses that enable the display to provide three-dimensional content to the viewer. The lenticular lenses may be formed over an array of pixels such as organic light-emitting diode pixels or liquid crystal display pixels.

SUMMARY

An electronic device may include a lenticular display. The lenticular display may have a lenticular lens film formed over an array of pixels. A plurality of lenticular lenses may extend across the length of the display. The lenticular lenses may be configured to enable stereoscopic viewing of the display such that a viewer perceives three-dimensional images.

The electronic device may also include an eye and/or head tracking system. The eye and/or head tracking system uses a camera to capture images of a viewer of the display. The capture images may be used to determine a viewer's eye position.

The display may have a number of independently controllable viewing zones. Each viewing zone displays a respective two-dimensional image. Each eye of the viewer may receive a different one of the two-dimensional images, resulting in a perceived three-dimensional image. Control circuitry in the electronic device may use the captured images from the eye and/or head tracking system to determine which viewing zones are occupied by the viewer's eyes.

The control circuitry may disable viewing zones that are not occupied by the viewer's eyes in order to conserve power. In some cases, the viewing zones may be set to follow a brightness profile that allows power to be conserved while avoiding latency artifacts. The brightness profile may be a step function or a gaussian function, with unoccupied viewing zones adjacent to the occupied viewing zones having non-zero brightness levels.

Control circuitry may also adjust the display to provide the same image in different viewing zones. An unoccupied viewing zone and an adjacent, occupied viewing zone may display the same image to increase sharpness in the display. The display may optionally include a louver film for blocking high angle light.

BRIEF DESCRIPTION OF THE DRAWINGS

FIGS. 7A-7C are perspective views of illustrative three-dimensional content that may be displayed on different zones of the display of FIG. 6 in accordance with an embodiment.

DETAILED DESCRIPTION

Figure 1:
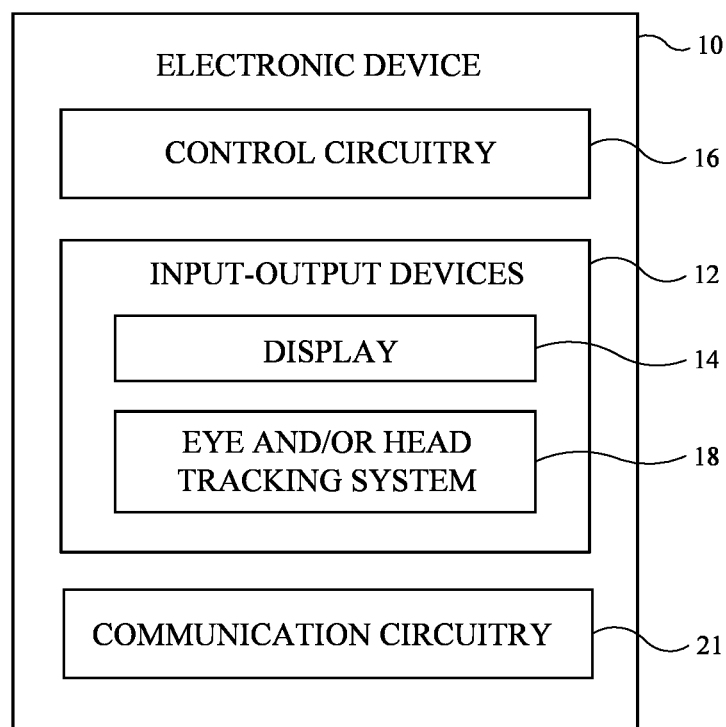
FIG. 1 is a schematic diagram of an illustrative electronic device having a display in accordance with an embodiment.

An illustrative electronic device of the type that may be provided with a display is shown in FIG. 1. Electronic device 10 may be a computing device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, an augmented reality (AR) headset and/or virtual reality (VR) headset, a device embedded in eyeglasses or other equipment worn on a user's head, or other wearable or miniature device, a display, a computer display that contains an embedded computer, a computer display that does not contain an embedded computer, a gaming device, a navigation device, an embedded system such as a system in which electronic equipment with a display is mounted in a kiosk or automobile, or other electronic equipment.

As shown in FIG. 1, electronic device 10 may have control circuitry 16. Control circuitry 16 may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 16 may be used to control the operation of device 10. The processing circuitry may be based on one or more microprocessors, microcontrollers, digital signal processors, baseband processors, power management units, audio chips, application specific integrated circuits, etc.

To support communications between device 10 and external equipment, control circuitry 16 may communicate using communications circuitry 21. Circuitry 21 may include antennas, radio-frequency transceiver circuitry, and other wireless communications circuitry and/or wired communications circuitry. Circuitry 21, which may sometimes be referred to as control circuitry and/or control and communications circuitry, may support bidirectional wireless communications between device 10 and external equipment over a wireless link (e.g., circuitry 21 may include radio-frequency transceiver circuitry such as wireless local area network transceiver circuitry configured to support communications over a wireless local area network link, near-field communications transceiver circuitry configured to support communications over a near-field communications link, cellular telephone transceiver circuitry configured to support communications over a cellular telephone link, or transceiver circuitry configured to support communications over any other suitable wired or wireless communications link). Wireless communications may, for example, be supported over a Bluetooth® link, a WiFi® link, a 60 GHz link or other millimeter wave link, a cellular telephone link, or other wireless communications link. Device 10 may, if desired, include power circuits for transmitting and/or receiving wired and/or wireless power and may include batteries or other energy storage devices. For example, device 10 may include a coil and rectifier to receive wireless power that is provided to circuitry in device 10.

Input-output circuitry in device 10 such as input-output devices 12 may be used to allow data to be supplied to device 10 and to allow data to be provided from device 10 to external devices. Input-output devices 12 may include buttons, joysticks, scrolling wheels, touch pads, key pads, keyboards, microphones, speakers, tone generators, vibrators, cameras, sensors, light-emitting diodes and other status indicators, data ports, and other electrical components. A user can control the operation of device 10 by supplying commands through input-output devices 12 and may receive status information and other output from device 10 using the output resources of input-output devices 12.

Input-output devices 12 may include one or more displays such as display 14. Display 14 may be a touch screen display that includes a touch sensor for gathering touch input from a user or display 14 may be insensitive to touch. A touch sensor for display 14 may be based on an array of capacitive touch sensor electrodes, acoustic touch sensor structures, resistive touch components, force-based touch sensor structures, a light-based touch sensor, or other suitable touch sensor arrangements.

Some electronic devices may include two displays. In one possible arrangement, a first display may be positioned on one side of the device and a second display may be positioned on a second, opposing side of the device. The first and second displays therefore may have a back-to-back arrangement. One or both of the displays may be curved.

Sensors in input-output devices 12 may include force sensors (e.g., strain gauges, capacitive force sensors, resistive force sensors, etc.), audio sensors such as microphones, touch and/or proximity sensors such as capacitive sensors (e.g., a two-dimensional capacitive touch sensor integrated into display 14, a two-dimensional capacitive touch sensor overlapping display 14, and/or a touch sensor that forms a button, trackpad, or other input device not associated with a display), and other sensors. If desired, sensors in input-output devices 12 may include optical sensors such as optical sensors that emit and detect light, ultrasonic sensors, optical touch sensors, optical proximity sensors, and/or other touch sensors and/or proximity sensors, monochromatic and color ambient light sensors, image sensors, fingerprint sensors, temperature sensors, sensors for measuring three-dimensional non-contact gestures ("air gestures"), pressure sensors, sensors for detecting position, orientation, and/or motion (e.g., accelerometers, magnetic sensors such as compass sensors, gyroscopes, and/or inertial measurement units that contain some or all of these sensors), health sensors, radio-frequency sensors, depth sensors (e.g., structured light sensors and/or depth sensors based on stereo imaging devices), optical sensors such as self-mixing sensors and light detection and ranging (lidar) sensors that gather time-of-flight measurements, humidity sensors, moisture sensors, gaze tracking sensors, and/or other sensors.

Control circuitry 16 may be used to run software on device 10 such as operating system code and applications. During operation of device 10, the software running on control circuitry 16 may display images on display 14 using an array of pixels in display 14.

Display 14 may be an organic light-emitting diode display, a liquid crystal display, an electrophoretic display, an electrowetting display, a plasma display, a microelectromechanical systems display, a display having a pixel array formed from crystalline semiconductor light-emitting diode dies (sometimes referred to as microLEDs), and/or other display. Configurations in which display 14 is an organic light-emitting diode display are sometimes described herein as an example.

Display 14 may have a rectangular shape (i.e., display 14 may have a rectangular footprint and a rectangular peripheral edge that runs around the rectangular footprint) or may have other suitable shapes. Display 14 may be planar or may have a curved profile.

Device 10 may include cameras and other components that form part of gaze and/or head tracking system 18. The camera(s) or other components of system 18 may face an expected location for a viewer and may track the viewer's eyes and/or head (e.g., images and other information captured by system 18 may be analyzed by control circuitry 16 to determine the location of the viewer's eyes and/or head). This head-location information obtained by system 18 may be used to determine the appropriate direction with which display content from display 14 should be directed. Eye and/or head tracking system 18 may include any desired number/combination of infrared and/or visible light detectors. Eye and/or head tracking system 18 may optionally include light emitters to illuminate the scene.

Figure 2:
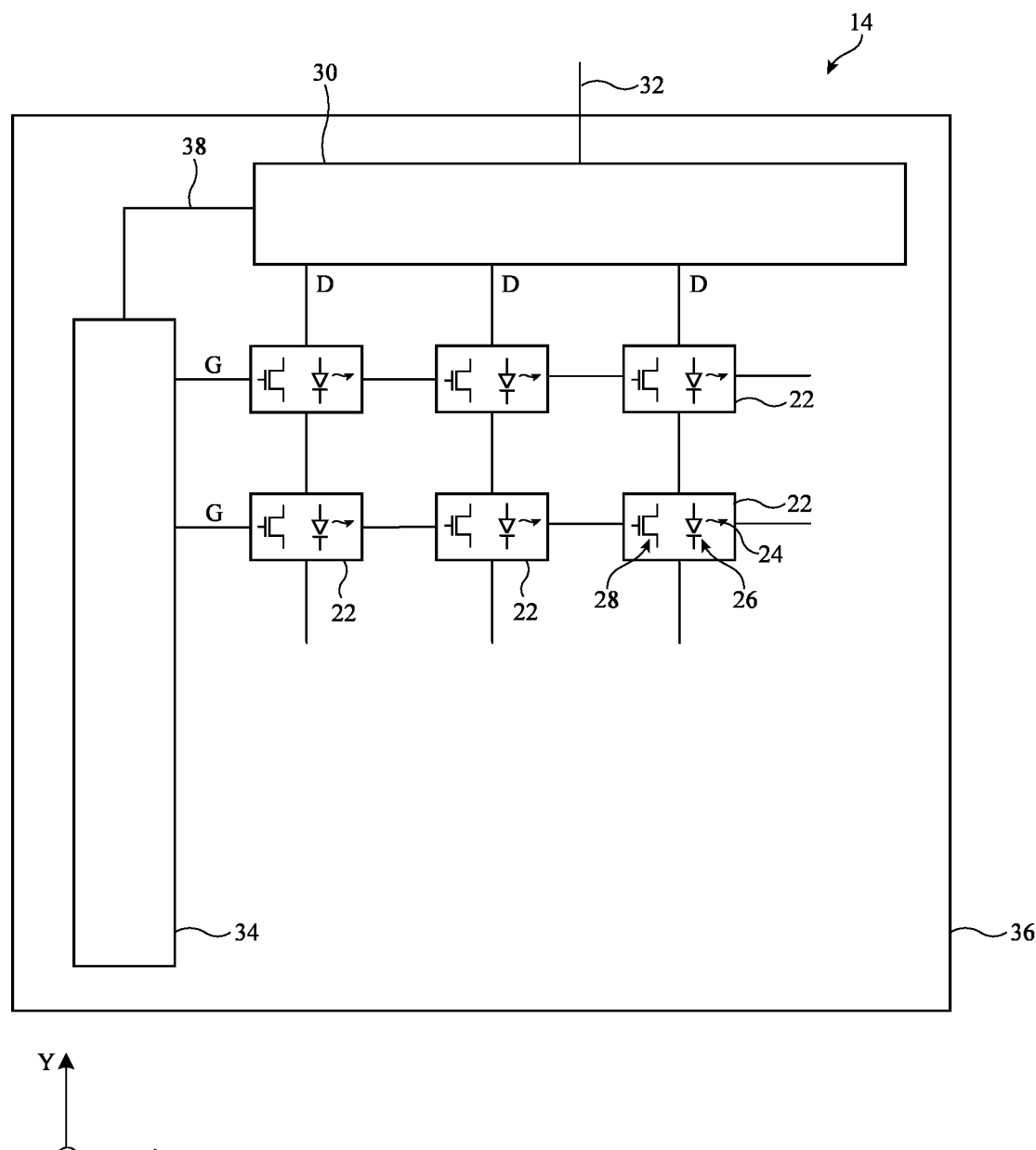
FIG. 2 is a top view of an illustrative display in an electronic device in accordance with an embodiment.

A top view of a portion of display 14 is shown in FIG. 2. As shown in FIG. 2, display 14 may have an array of pixels 22 formed on substrate 36. Substrate 36 may be formed from glass, metal, plastic, ceramic, or other substrate materials. Pixels 22 may receive data signals over signal paths such as data lines D and may receive one or more control signals over control signal paths such as horizontal control lines G (sometimes referred to as gate lines, scan lines, emission control lines, etc.). There may be any suitable number of rows and columns of pixels 22 in display 14 (e.g., tens or more, hundreds or more, or thousands or more). Each pixel 22 may have a light-emitting diode 26 that emits light 24 under the control of a pixel circuit formed from thin-film transistor circuitry (such as thin-film transistors 28 and thin-film capacitors). Thin-film transistors 28 may be polysilicon thin-film transistors, semiconducting-oxide thin-film transistors such as indium gallium zinc oxide transistors, or thin-film transistors formed from other semiconductors. Pixels 22 may contain light-emitting diodes of different colors (e.g., red, green, and blue diodes for red, green, and blue pixels, respectively) to provide display 14 with the ability to display color images.

Display driver circuitry may be used to control the operation of pixels 22. The display driver circuitry may be formed from integrated circuits, thin-film transistor circuits, or other suitable circuitry. Display driver circuitry 30 of FIG. 2 may contain communications circuitry for communicating with system control circuitry such as control circuitry 16 of FIG. 1 over path 32. Path 32 may be formed from traces on a flexible printed circuit or other cable. During operation, the control circuitry (e.g., control circuitry 16 of FIG. 1) may supply circuitry 30 with information on images to be displayed on display 14.

To display the images on display pixels 22, display driver circuitry 30 may supply image data to data lines D while issuing clock signals and other control signals to supporting display driver circuitry such as gate driver circuitry 34 over path 38. If desired, circuitry 30 may also supply clock signals and other control signals to gate driver circuitry on an opposing edge of display 14.

Gate driver circuitry 34 (sometimes referred to as horizontal control line control circuitry) may be implemented as part of an integrated circuit and/or may be implemented using thin-film transistor circuitry. Horizontal control lines G in display 14 may carry gate line signals (scan line signals), emission enable control signals, and other horizontal control signals for controlling the pixels of each row. There may be any suitable number of horizontal control signals per row of pixels 22 (e.g., one or more, two or more, three or more, four or more, etc.).

Display 14 may sometimes be a stereoscopic display that is configured to display three-dimensional content for a viewer. Stereoscopic displays are capable of displaying multiple two-dimensional images that are viewed from slightly different angles. When viewed together, the combination of the two-dimensional images creates the illusion of a three-dimensional image for the viewer. For example, a viewer's left eye may receive a first two-dimensional image and a viewer's right eye may receive a second, different two-dimensional image. The viewer perceives these two different two-dimensional images as a single three-dimensional image.

There are numerous ways to implement a stereoscopic display. Display 14 may be a lenticular display that uses lenticular lenses (e.g., elongated lenses that extend along parallel axes), may be a parallax barrier display that uses parallax barriers (e.g., an opaque layer with precisely spaced slits to create a sense of depth through parallax), may be a volumetric display, or may be any other desired type of stereoscopic display. Configurations in which display 14 is a lenticular display are sometimes described herein as an example.

Figure 3:
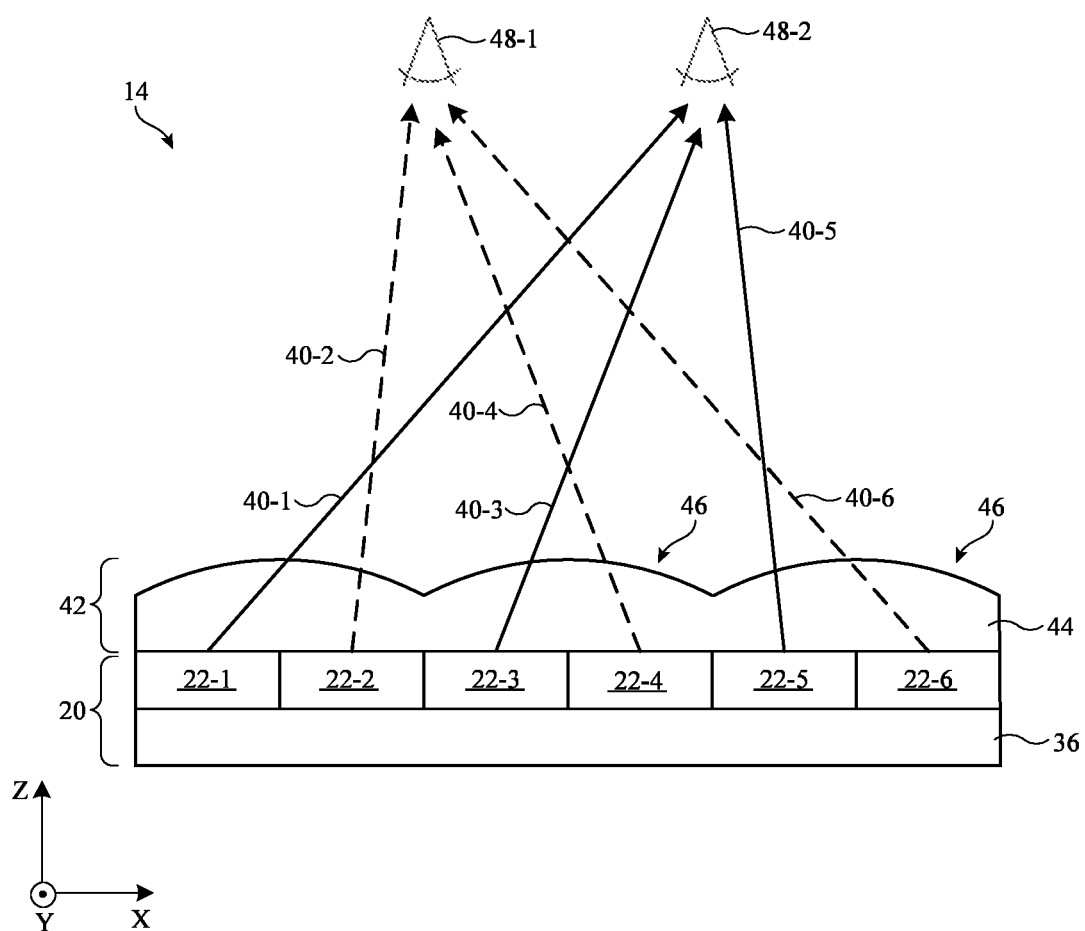
FIG. 3 is a cross-sectional side view of an illustrative lenticular display that provides images to a viewer in accordance with an embodiment.

FIG. 3 is a cross-sectional side view of an illustrative lenticular display that may be incorporated into electronic device 10. Display 14 includes a display panel 20 with pixels 22 on substrate 36. Substrate 36 may be formed from glass, metal, plastic, ceramic, or other substrate materials and pixels 22 may be organic light-emitting diode pixels, liquid crystal display pixels, or any other desired type of pixels.

As shown in FIG. 3, lenticular lens film 42 may be formed over the display pixels. Lenticular lens film 42 (sometimes referred to as a light redirecting film, a lens film, etc.) includes lenses 46 and a base film portion 44 (e.g., a planar film portion to which lenses 46 are attached). Lenses 46 may be lenticular lenses that extend along respective longitudinal axes (e.g., axes that extend into the page parallel to the Y-axis). Lenses 46 may be referred to as lenticular elements 46, lenticular lenses 46, optical elements 46, etc.

The lenses 46 of the lenticular lens film cover the pixels of display 14. An example is shown in FIG. 3 with display pixels 22-1, 22-2, 22-3, 22-4, 22-5, and 22-6. In this example, display pixels 22-1 and 22-2 are covered by a first lenticular lens 46, display pixels 22-3 and 22-4 are covered by a second lenticular lens 46, and display pixels 22-5 and 22-6 are covered by a third lenticular lens 46. The lenticular lenses may redirect light from the display pixels to enable stereoscopic viewing of the display.

Consider the example of display 14 being viewed by a viewer with a first eye (e.g., a right eye) 48-1 and a second eye (e.g., a left eye) 48-2. Light from pixel 22-1 is directed by the lenticular lens film in direction 40-1 towards left eye 48-2, light from pixel 22-2 is directed by the lenticular lens film in direction 40-2 towards right eye 48-1, light from pixel 22-3 is directed by the lenticular lens film in direction 40-3 towards left eye 48-2, light from pixel 22-4 is directed by the lenticular lens film in direction 40-4 towards right eye 48-1, light from pixel 22-5 is directed by the lenticular lens film in direction 40-5 towards left eye 48-2, light from pixel 22-6 is directed by the lenticular lens film in direction 40-6 towards right eye 48-1. In this way, the viewer's right eye 48-1 receives images from pixels 22-2, 22-4, and 22-6, whereas left eye 48-2 receives images from pixels 22-1, 22-3, and 22-5. Pixels 22-2, 22-4, and 22-6 may be used to display a slightly different image than pixels 22-1, 22-3, and 22-5. Consequently, the viewer may perceive the received images as a single three-dimensional image.

Pixels of the same color may be covered by a respective lenticular lens 46. In one example, pixels 22-1 and 22-2 may be red pixels that emit red light, pixels 22-3 and 22-4 may be green pixels that emit green light, and pixels 22-5 and 22-6 may be blue pixels that emit blue light. This example is merely illustrative. In general, each lenticular lens may cover any desired number of pixels each having any desired color. The lenticular lens may cover a plurality of pixels having the same color, may cover a plurality of pixels each having different colors, may cover a plurality of pixels with some pixels being the same color and some pixels being different colors, etc.

Figure 4:
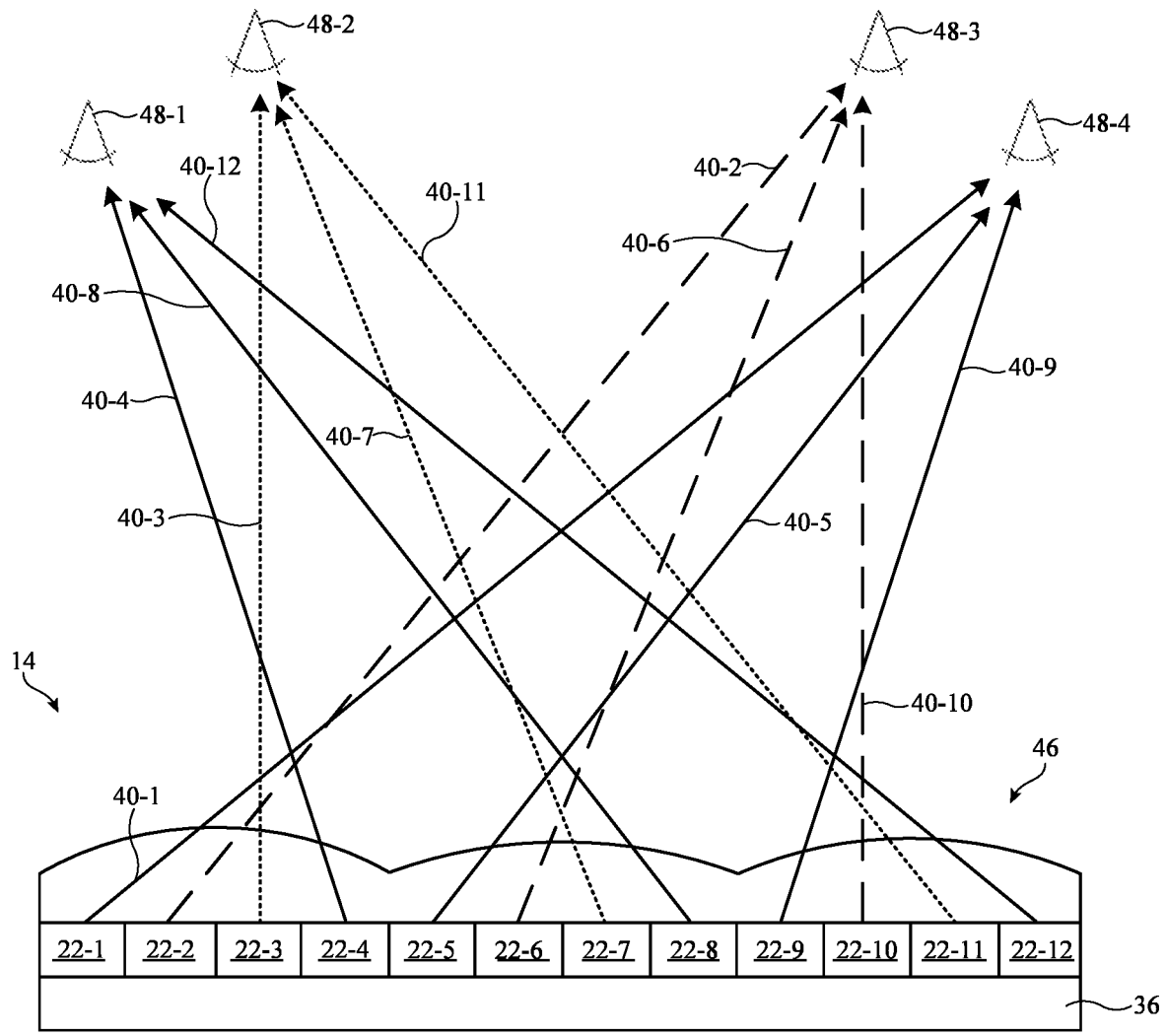
FIG. 4 is a cross-sectional side view of an illustrative lenticular display that provides images to two or more viewers in accordance with an embodiment.

FIG. 4 is a cross-sectional side view of an illustrative stereoscopic display showing how the stereoscopic display may be viewable by multiple viewers. The stereoscopic display of FIG. 3 may have one optimal viewing position (e.g., one viewing position where the images from the display are perceived as three-dimensional). The stereoscopic display of FIG. 4 may have two or more optimal viewing positions (e.g., two or more viewing positions where the images from the display are perceived as three-dimensional).

Display 14 may be viewed by both a first viewer with a right eye 48-1 and a left eye 48-2 and a second viewer with a right eye 48-3 and a left eye 48-4. Light from pixel 22-1 is directed by the lenticular lens film in direction 40-1 towards left eye 48-4, light from pixel 22-2 is directed by the lenticular lens film in direction 40-2 towards right eye 48-3, light from pixel 22-3 is directed by the lenticular lens film in direction 40-3 towards left eye 48-2, light from pixel 22-4 is directed by the lenticular lens film in direction 40-4 towards right eye 48-1, light from pixel 22-5 is directed by the lenticular lens film in direction 40-5 towards left eye 48-4, light from pixel 22-6 is directed by the lenticular lens film in direction 40-6 towards right eye 48-3, light from pixel 22-7 is directed by the lenticular lens film in direction 40-7 towards left eye 48-2, light from pixel 22-8 is directed by the lenticular lens film in direction 40-8 towards right eye 48-1, light from pixel 22-9 is directed by the lenticular lens film in direction 40-9 towards left eye 48-4, light from pixel 22-10 is directed by the lenticular lens film in direction 40-10 towards right eye 48-3, light from pixel 22-11 is directed by the lenticular lens film in direction 40-11 towards left eye 48-2, and light from pixel 22-12 is directed by the lenticular lens film in direction 40-12 towards right eye 48-1. In this way, the first viewer's right eye 48-1 receives images from pixels 22-4, 22-8, and 22-12, whereas left eye 48-2 receives images from pixels 22-3, 22-7, and 22-11. Pixels 22-4, 22-8, and 22-12 may be used to display a slightly different image than pixels 22-3, 22-7, and 22-11. Consequently, the first viewer may perceive the received images as a single three-dimensional image. Similarly, the second viewer's right eye 48-3 receives images from pixels 22-2, 22-6, and 22-10, whereas left eye 48-4 receives images from pixels 22-1, 22-5, and 22-9. Pixels 22-2, 22-6, and 22-10 may be used to display a slightly different image than pixels 22-1, 22-5, and 22-9. Consequently, the second viewer may perceive the received images as a single three-dimensional image.

Pixels of the same color may be covered by a respective lenticular lens 46. In one example, pixels 22-1, 22-2, 22-3, and 22-4 may be red pixels that emit red light, pixels 22-5, 22-6, 22-7, and 22-8 may be green pixels that emit green light, and pixels 22-9, 22-10, 22-11, and 22-12 may be blue pixels that emit blue light. This example is merely illustrative. The display may be used to present the same three-dimensional image to both viewers or may present different three-dimensional images to different viewers. In some cases, control circuitry in the electronic device 10 may use eye and/or head tracking system 18 to track the position of one or more viewers and display images on the display based on the detected position of the one or more viewers.

It should be understood that the lenticular lens shapes and directional arrows of FIGS. 3 and 4 are merely illustrative. The actual rays of light from each pixel may follow more complicated paths (e.g., with redirection occurring due to refraction, total internal reflection, etc.). Additionally, light from each pixel may be emitted over a range of angles. The lenticular display may also have lenticular lenses of any desired shape or shapes. Each lenticular lens may have a width that covers two pixels, three pixels, four pixels, more than four pixels, more than ten pixels, etc. Each lenticular lens may have a length that extends across the entire display (e.g., parallel to columns of pixels in the display).

Figure 5:
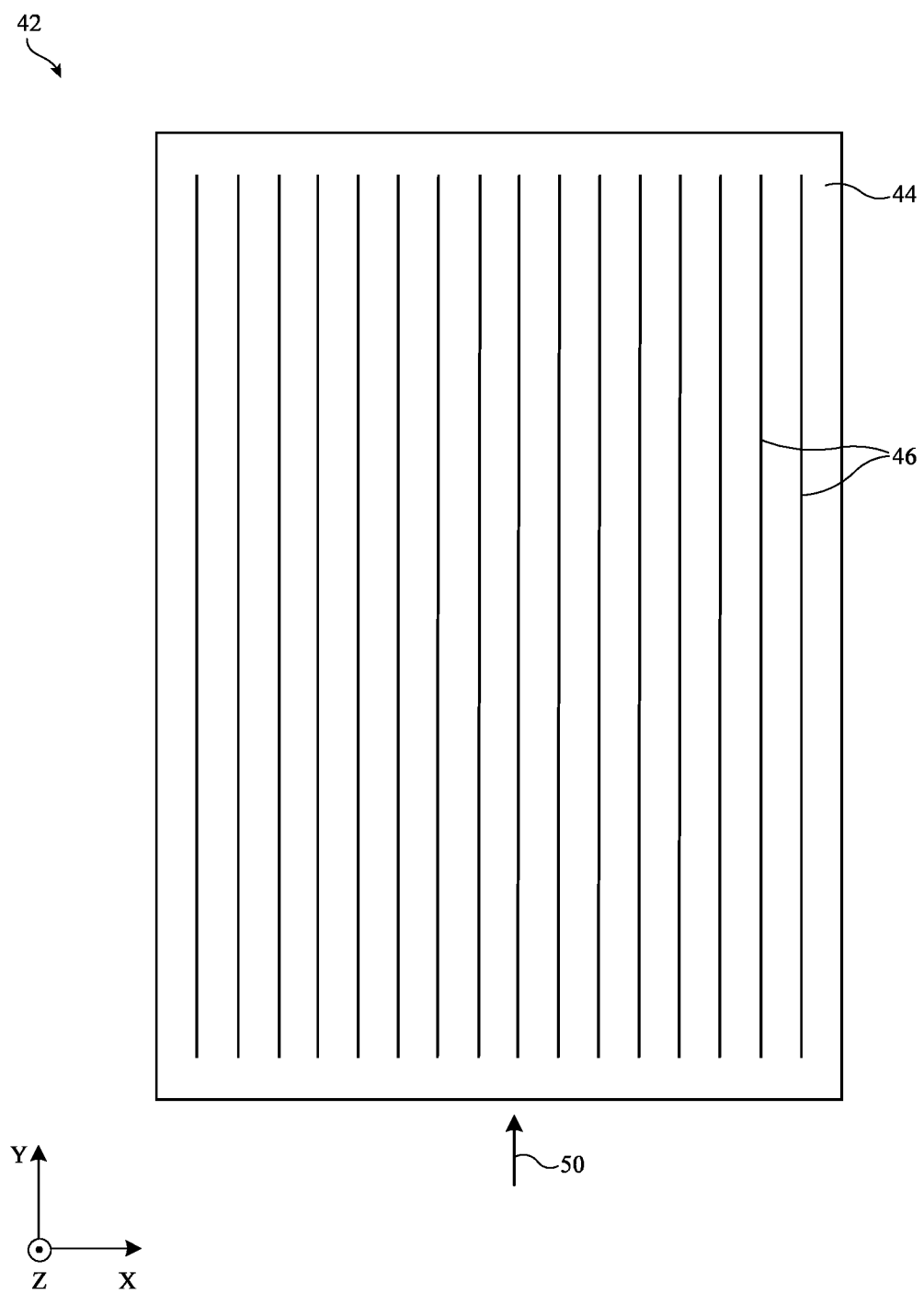
FIG. 5 is a top view of an illustrative lenticular lens film showing the elongated shape of the lenticular lenses in accordance with an embodiment.

FIG. 5 is a top view of an illustrative lenticular lens film that may be incorporated into a lenticular display. As shown in FIG. 5, elongated lenses 46 extend across the display parallel to the Y-axis. For example, the cross-sectional side view of FIGS. 3 and 4 may be taken looking in direction 50. The lenticular display may include any desired number of lenticular lenses 46 (e.g., more than 10, more than 100, more than 1,000, more than 10,000, etc.). In FIG. 5, the lenticular lenses extend perpendicular to the upper and lower edge of the display panel. This arrangement is merely illustrative, and the lenticular lenses may instead extend at a non-zero, non-perpendicular angle (e.g., diagonally) relative to the display panel if desired.

Figure 6:
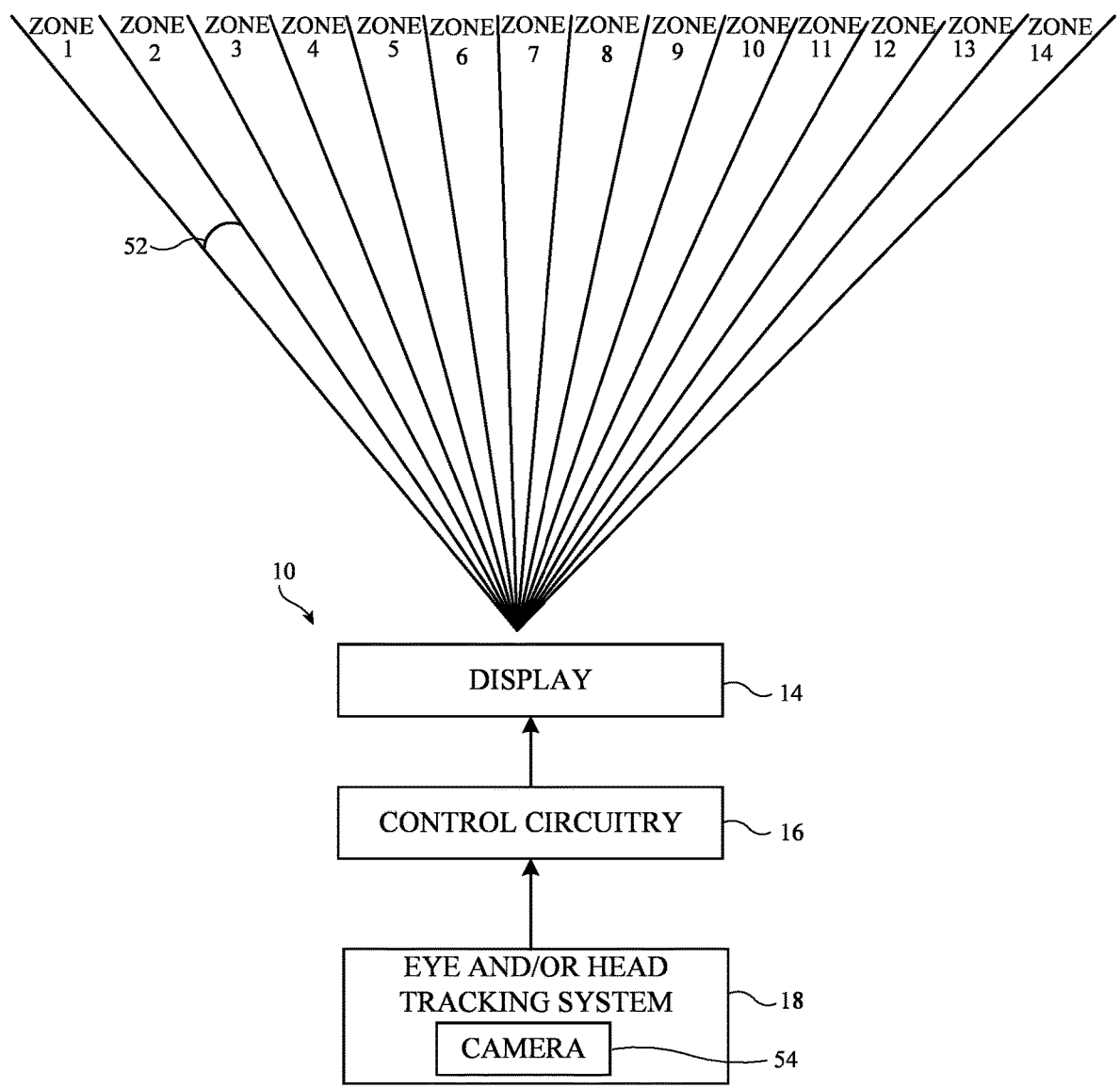
FIG. 6 is a diagram of an illustrative display that includes an eye and/or head tracking system that determines viewer eye position and control circuitry that updates the display based on the viewer eye position in accordance with an embodiment.

FIG. 6 is a schematic diagram of an illustrative electronic device showing how information from eye and/or head tracking system 18 may be used to control operation of the display. As shown in FIG. 6, display 14 is capable of providing unique images across a number of distinct zones. In FIG. 6, display 14 emits light across 14 zones, each having a respective angle of view 52. The angle 52 may be between 1° and 2°, between 0° and 4°, less than 5°, less than 3°, less than 2°, less than 1.5°, greater than 0.5°, or any other desired angle. Each zone may have the same associated viewing angle or different zones may have different associated viewing angles.

The example herein of the display having 14 independently controllable zones is merely illustrative. In general, the display may have any desired number of independently controllable zones (e.g., more than 2, more than 6, more than 10, more than 12, more than 16, more than 20, more than 30, more than 40, less than 40, between 10 and 30, between 12 and 25, etc.).

Each zone is capable of displaying a unique image to the viewer. The sub-pixels on display 14 may be divided into groups, with each group of sub-pixels capable of displaying an image for a particular zone. For example, a first subset of sub-pixels in display 14 is used to display an image (e.g., a two-dimensional image) for zone 1, a second subset of sub-pixels in display 14 is used to display an image for zone 2, a third subset of sub-pixels in display 14 is used to display an image for zone 3, etc. In other words, the sub-pixels in display 14 may be divided into 14 groups, with each group associated with a corresponding zone (sometimes referred to as viewing zone) and capable of displaying a unique image for that zone. The sub-pixel groups may also themselves be referred to as zones.

Control circuitry 16 may control display 14 to display desired images in each viewing zone. There is much flexibility in how the display provides images to the different viewing zones. Display 14 may display entirely different content in different zones of the display. For example, an image of a first object (e.g., a cube) is displayed for zone 1, an image of a second, different object (e.g., a pyramid) is displayed for zone 2, an image of a third, different object (e.g., a cylinder) is displayed for zone 3, etc. This type of scheme may be used to allow different viewers to view entirely different scenes from the same display. However, in practice there may be crosstalk between the viewing zones. As an example, content intended for zone 3 may not be contained entirely within viewing zone 3 and may leak into viewing zones 2 and 4.

Therefore, in another possible use-case, display 14 may display a similar image for each viewing zone, with slight adjustments for perspective between each zone. This may be referred to as displaying the same content at different perspectives, with one image corresponding to a unique perspective of the same content. For example, consider an example where the display is used to display a three-dimensional cube. The same content (e.g., the cube) may be displayed on all of the different zones in the display. However, the image of the cube provided to each viewing zone may account for the viewing angle associated with that particular zone. In zone 1, for example, the viewing cone may be at a −10° angle relative to the surface normal of the display. Therefore, the image of the cube displayed for zone 1 may be from the perspective of a −10° angle relative to the surface normal of the cube (as in FIG. 7A). Zone 7, in contrast, is at approximately the surface normal of the display. Therefore, the image of the cube displayed for zone 7 may be from the perspective of a 0° angle relative to the surface normal of the cube (as in FIG. 7B). Zone 14 is at a 10° angle relative to the surface normal of the display. Therefore, the image of the cube displayed for zone 14 may be from the perspective of a 10° angle relative to the surface normal of the cube (as in FIG. 7C). As a viewer progresses from zone 1 to zone 14 in order, the appearance of the cube gradually changes to simulate looking at a real-world object.

There are many possible variations for how display 14 displays content for the viewing zones. In general, each viewing zone may be provided with any desired image based on the application of the electronic device. Different zones may provide different images of the same content at different perspectives, different zones may provide different images of different content, etc.

In one possible scenario, display 14 may display images for all of the viewing zones at the same time. However, this requires emitting light with all of the sub-pixels in the display in order to generate images for each viewing zone. Simultaneously providing images for all of the viewing zones at the same time therefore may consume more power than is desired. To reduce power consumption in the display, one or more of the zones may be disabled based on information from the eye and/or head tracking system 18.

Eye and/or head tracking system 18 (sometimes referred to as viewer tracking system 18, head tracking system 18, or tracking system 18) may use one or more cameras such as camera 54 to capture images of the area in front of the display 14 where a viewer is expected to be present. The tracking system may use the captured images to identify a position of the viewer relative to the viewing zones. In other words, the tracking system may be used to determine which viewing zone(s) the viewer is occupying. Each eye of the user may be associated with a different viewing zone (in order to allow three-dimensional content to be perceived by the user from the display). Based on the captured images, tracking system 18 may identify a first viewing zone associated with a left eye of the viewer and a second viewing zone associated with a right eye of the viewer. Tracking system 18 may use one camera, two cameras, three cameras, more than three cameras, etc. to obtain information on the position of the viewer(s). The cameras in the tracking system may capture visible light and/or infrared light images.

Control circuitry 16 may use information from tracking system 18 to selectively disable unoccupied viewing zones. Disabling unoccupied viewing zones conserves power within the electronic device. Control circuitry 16 may receive various types of information from tracking system 18 regarding the position of the viewer. Control circuitry 16 may receive raw data from head tracking system 18 and process the data to determine the position of a viewer, may receive position coordinates from head tracking system 18, may receive an identification of one or more occupied viewing zones from head tracking system 18, etc. If head tracking system 18 includes processing circuitry configured to process data from the one or more cameras to determine the viewer position, this portion of the head tracking system may also be considered control circuitry (e.g., control circuitry 16). Control circuitry 16 may include a graphics processing unit (GPU) that generates image data to be displayed on display 14. The GPU may generate image data based on the viewer position information.

In general, electronic device 10 includes one or more cameras 54 for capturing images of an environment around the display (e.g., an area in front of the display where viewers are expected to be located). Control circuitry within the electronic device uses the images from the one or more cameras to identify which viewing zones are occupied by the viewer. The control circuitry then controls the display accordingly based on the occupied viewing zones.

Figure 8A:
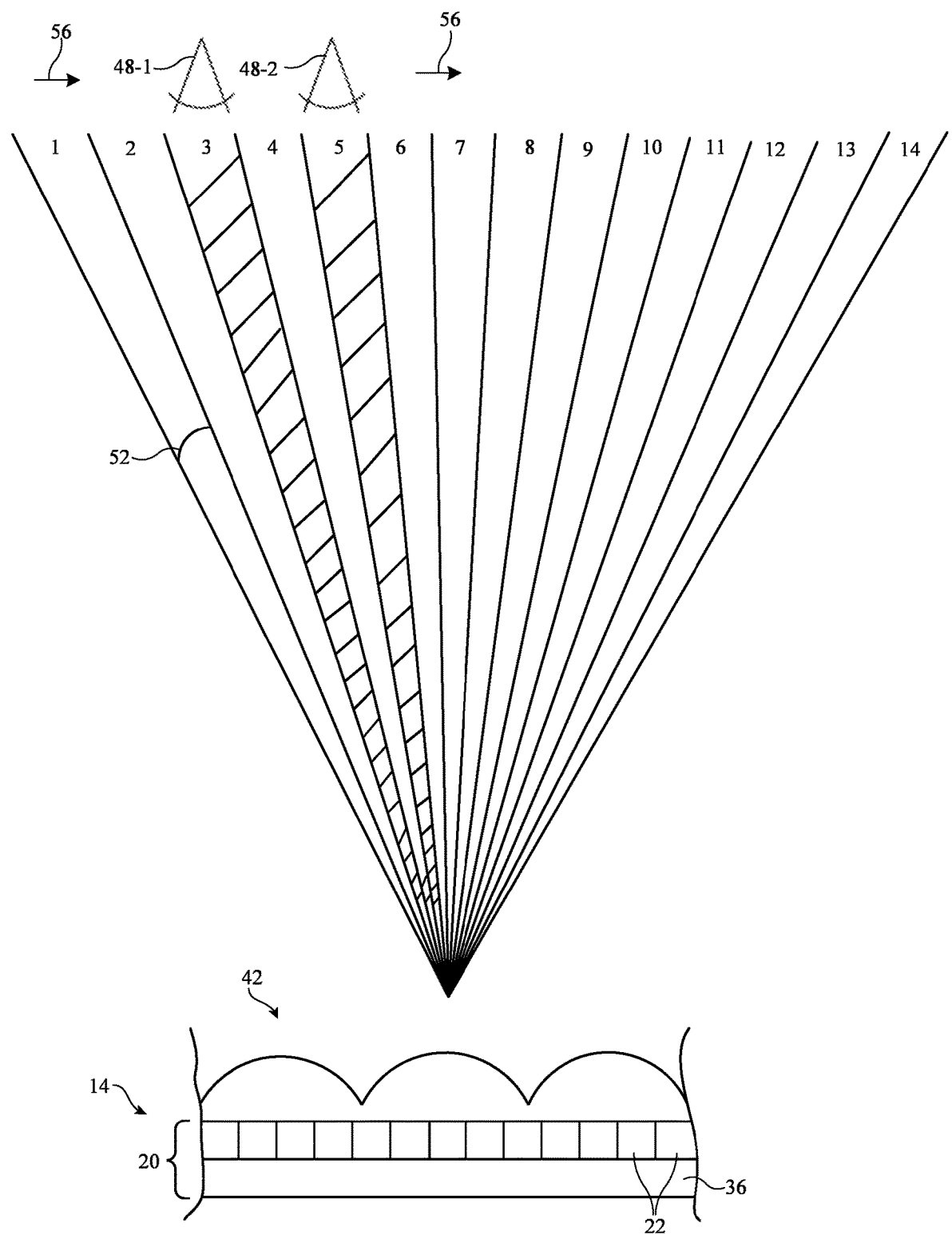
FIGS. 8A and 8B are side views of an illustrative display showing how viewing zones may be enabled and disabled based on viewer eye position information in accordance with an embodiment.
Figure 8B:
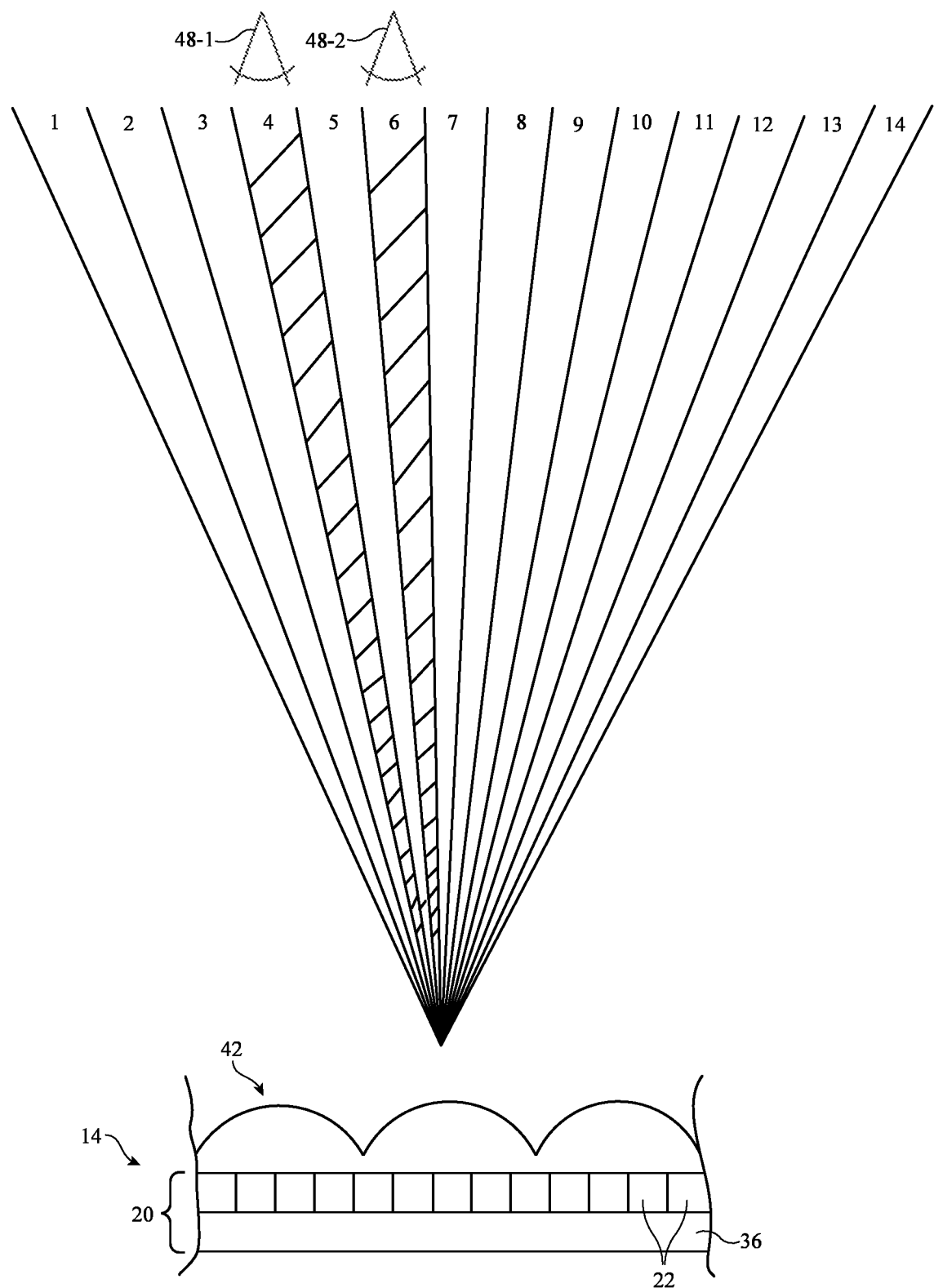

FIGS. 8A and 8B are diagrams illustrating how viewing zones may be disabled to reduce power consumption in the electronic device. As shown in FIG. 8A, display 14 is being viewed by a viewer with a first eye (e.g., a right eye) 48-1 and a second eye (e.g., a left eye) 48-2. The first eye 48-1 is in viewing zone 3 whereas the second eye is present in viewing zone 5.

A camera in head tracking system 18 may capture an image of the viewer and identify the location of eyes 48-1 and 48-2. Accordingly, control circuitry in the electronic device may determine that the user's eyes are present in viewing zones 3 and 5. In response, the control circuitry controls display 14 to display the desired images in viewing zones 3 and 5. However, the other viewing zones (e.g., zones 1, 2, 4, and 6-14) are disabled. In other words, the sub-pixels of the other zones are turned off so that they do not emit light and do not consume power. This saves power consumption within the electronic device while providing a satisfactory user experience with the active zones 3 and 5. The zones where light is emitted (e.g., zones 3 and 5 in FIG. 8A) may sometimes be referred to as active zones, enabled zones, zones that are 'on', or lit zones. The zones where light is not emitted (e.g., zones 1, 2, 4, and 6-14 in FIG. 8A) may sometimes be referred to as inactive zones, disabled zones, zones that are 'off', or unlit zones.

The active zones may be updated based on the real-time position of the viewer. For example, the viewer may shift in direction 56 as shown in FIG. 8A. After shifting positions, the viewer may end up in the position shown in FIG. 8B. Eye 48-1 is now aligned with zone 4 and eye 48-2 is now aligned with zone 6. Tracking system 18 may identify this shift in position based on images captured of the viewer. In response to the position change, control circuitry 16 updates display 14 to turn on zones 4 and 6 and turn off the remaining zones (zones 1-3, 5, and 7-14), as shown in FIG. 8B. In this way, control circuitry 16 may continually update display 14 to activate only the zones where the viewer's eyes are present and disable the remaining zones.

Ideally, tracking system 18 would always quickly and accurately identify the position of the viewer. This information would then be used by the control circuitry to update the display in real time, such that the activated viewing zones always align with the viewer's eyes. In practice, however, there may be latency between a viewer changing position and the display being updated accordingly. If the user changes position quickly, they may move into an inactive zone and the display will appear dark (off) until the display updates. In other scenarios, due to a variety of possible factors the tracking system 18 may lose the position of the viewer in the scene. This is sometimes referred to as tracking loss. If tracking loss occurs, the viewer may shift position to a new viewing zone without being detected by the tracking system. This again may result in the viewer shifting to a position where the display appears to be dark (even though the display should be showing content to the user).

Figure 9A:
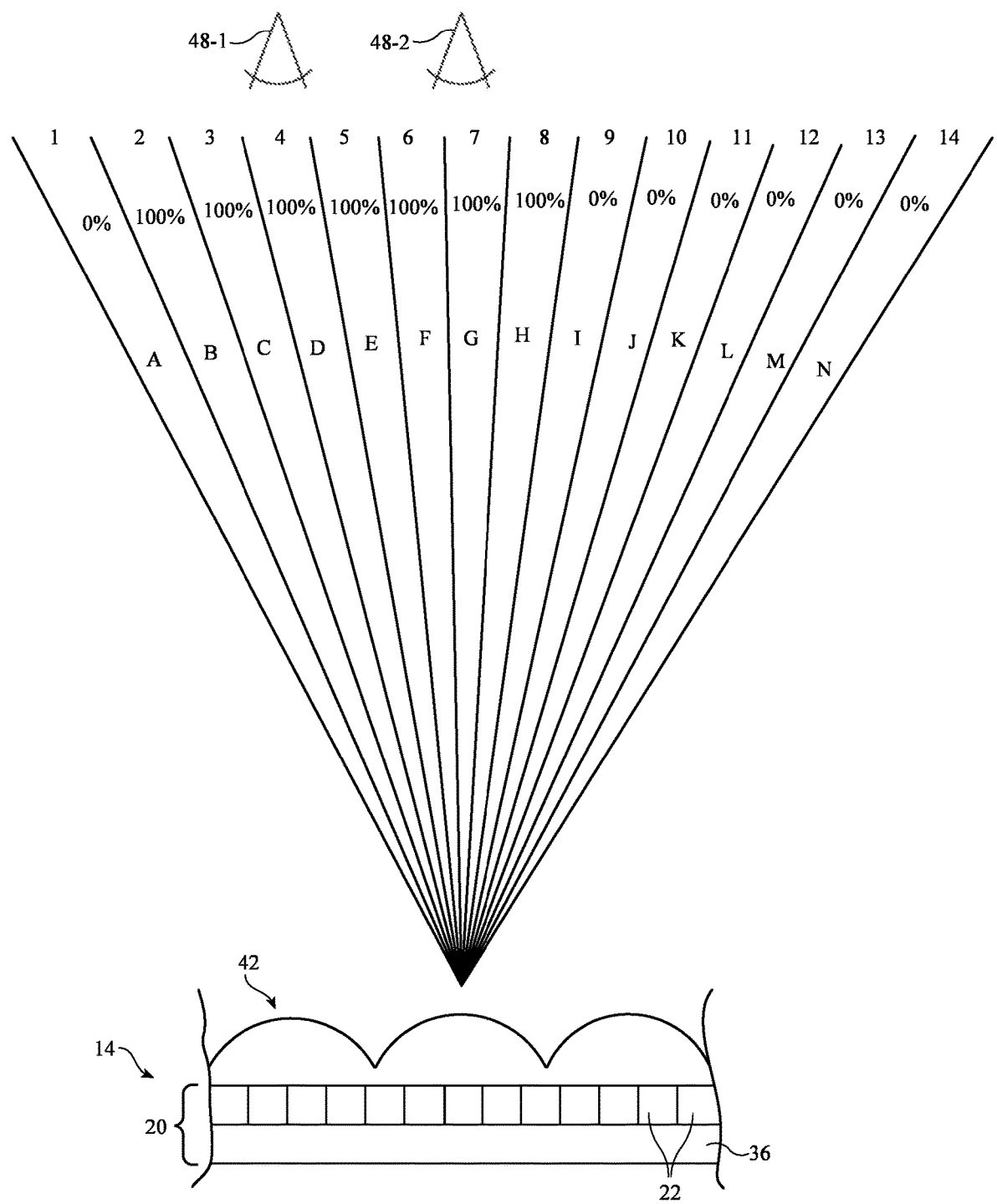
FIG. 9A is a side view of an illustrative display with unoccupied zones that have brightness levels that follow a step function in accordance with an embodiment.

To prevent visible artifacts caused by latency and/or tracking loss, the display may emit light for viewing zones that are not occupied. FIG. 9A is a diagram showing a display emitting light at full brightness in several unoccupied viewing zones. In the example of FIG. 9A, eye 48-1 is in zone 4 and eye 48-2 is in zone 6. These zones therefore have full brightness (e.g., 100% brightness as indicated in FIG. 9A). However, some of the adjacent zones to zones 4 and 6 also have full brightness even though they are currently unoccupied by a viewer. As shown in FIG. 9A, zones, 2, 3, 5, 7, and 8 are enabled (e.g., operating at 100% brightness). Zones 1 and 9-14 remain disabled (e.g., turned off at 0% brightness).

The arrangement of FIG. 9A may mitigate visible artifacts for the viewer when the viewer shifts positions to adjacent viewing zones. For example, in FIG. 9A the viewer may shift to their right, resulting in eye 48-1 occupying viewing zone 3 and eye 48-2 occupying viewing zone 5. Due to tracking latency, electronic device 10 may not recognize and update display 14 based on this shift for some length of time. If zones 1-3, 5, and 7-14 are all turned off (e.g., as in FIG. 8B), the display appears dark for the viewer during the entirety of the latency time. With the scheme of FIG. 9A, however, the viewer still perceives the content on the display correctly during the latency time due to zones 3 and 5 already being at 100% brightness.

It should be noted that each zone may have a corresponding image. As shown in FIG. 9A, zone 1 displays image A, zone 2 displays image B, zone 3 displays image C, . . . , zone 14 displays image N. The image of each zone may be unique (e.g., tailored to the particular perspective associated with that viewing zone). In this example, the images A-N may all be associated with the same content (at unique perspectives). In this way, the viewer may shift position while the three-dimensional image appears as a stationary, real-life object. This example is merely illustrative and other images may be used for images A-N if desired.

Because zones 3 and 5 are displaying images C and E at full brightness, if the user shifts position to zones 3 and 5 they will immediately perceive the images C and E (which have the correct perspective for those positions) without waiting for the display to update. Therefore, the user may seamlessly transition between viewing zones without visible artifacts caused by latency, loss of viewer tracking capabilities, etc.

In FIG. 9A, the brightness of the viewing zones follows a step-function relative to the occupied viewing zones. In other words, each occupied viewing zone (zones 4 and 6 in FIG. 9A) has two adjacent viewing zones on either side that are also provided at full brightness. For example, zones 7 and 8 to the right of zone 6 are provided at full brightness and zones 2 and 3 to the left of zone 4 are provided at full brightness. Past these zones, however, the brightness drops to 0% (e.g., the zones are disabled). This example is merely illustrative. In another example, only one adjacent viewing zone on either side of the occupied viewing zone may operate at full brightness.

Figure 9B:
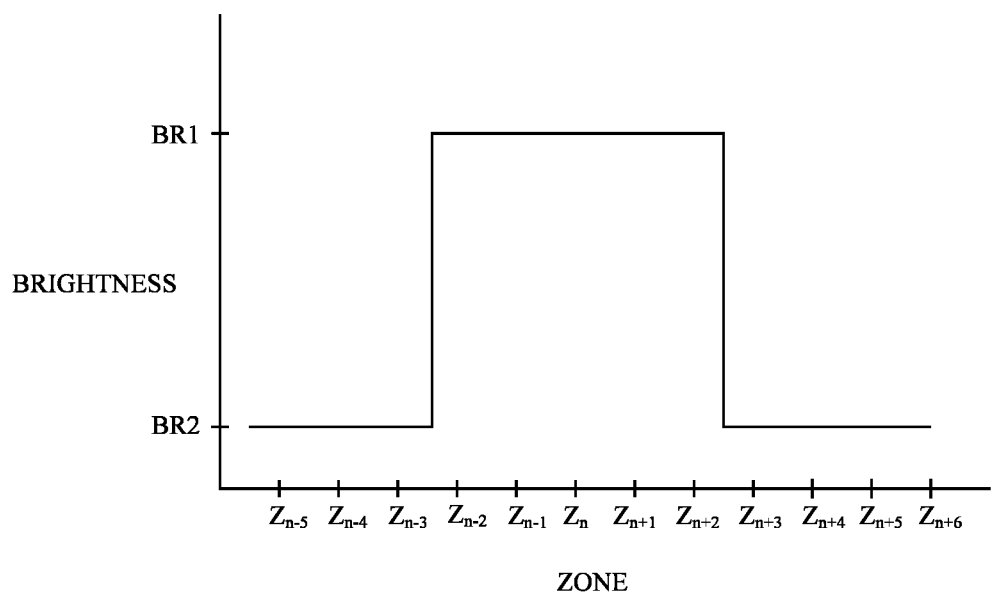
FIG. 9B is a graph of an illustrative step function that may be used to determine zone brightness levels in accordance with an embodiment.

FIG. 9B is a graph of an illustrative brightness profile that may be used for the display zones. As shown in FIG. 9B, there may be a zone $Z_n$ where the viewer's eye is located. Zones are present on either side of zone $Z_n$ (e.g., $Z_{n-1}$, $Z_{n-2}$, $Z_{n-3}$, $Z_{n+1}$, $Z_{n+2}$, $Z_{n+3}$, etc.). In FIG. 9B, the brightness at zone $Z_n$ is BR1. This may be 100% (e.g., the maximum brightness the display is capable of) or some other desired peak brightness (e.g., a brightness determined to be appropriate for the real time lighting conditions of the display). For example, in dim ambient light conditions BR1 may be less than the maximum brightness the display is capable of. BR1 may be referred to as a full brightness level.

In FIG. 9B, two zones adjacent to $Z_n$ have the same brightness as $Z_n$. Zones $Z_{n+1}$, $Z_{n+2}$, $Z_{n-1}$, and $Z_{n-2}$ all have the same brightness BR1 as $Z_n$. Past this point, however, the brightness drops to BR2 (e.g., 0% or off). As shown in FIG. 9B, zones that are 3 or more zones away from the zone including the viewer's eye may be operated at lower brightness level BR2.

Of course, the viewer's second eye may be present in a zone near the viewer's first eye. Unoccupied zones that are interposed between two eyes may have a brightness dictated by the dimming profile for the closer eye, may have the highest brightness of the two magnitudes associated with each respective eye's brightness profile, etc. The number of unoccupied zones between a user's eyes may depend upon the particular display design, the distance of the user from the display, etc. Therefore, for simplicity, the zone brightness profiles (as in FIG. 9B) are characterized relative to a single zone (e.g., $Z_n$ in FIG. 9B) associated with a single eye.

The specific characteristics of the brightness profile of FIG. 9B may be tuned based on the desired power consumption savings, viewer experience, and other factors associated with a particular electronic device design. In general, having more unoccupied zones enabled and having higher brightness levels within each unoccupied zone is optimal for a user's viewing experience (as artifacts will be minimal even if there is latency or tracking loss). Having fewer unoccupied zones enabled and having lower brightness levels within each unoccupied zone is optimal for reducing power consumption. These tradeoffs may be balanced for each design, may be adjusted by a user of the electronic device, may be adjusted based on other factors (e.g., ambient light conditions), etc.

In other words, the number of adjacent zones on either side of $Z_n$ in FIG. 9B at brightness BR1 may be 0, 1, 2 (as in FIG. 9B), 3, 4, more than 4, more than 2, between 1 and 5, etc. The brightness level BR1 may be 100% or less than 100%. Brightness level BR2 may be 0% or greater than 0%.

In the step function of FIG. 9B, zones are placed in one of two states (e.g., the on state at 100% brightness or the off state at 0% brightness). This example is merely illustrative. In another possible brightness scheme, the brightness may be gradually lowered in unoccupied zones adjacent to the occupied zones. The further away an unoccupied zone is from an occupied zone, the less likely it is that the viewer will reach that zone without the gaze tracker identifying the shift in position and updating the display accordingly. Accordingly, having further away unoccupied zones at high brightness levels is less important than close unoccupied zones. The brightness levels of the unoccupied zones may therefore be decreased gradually with increasing distance from the occupied zones.

Figure 10A:
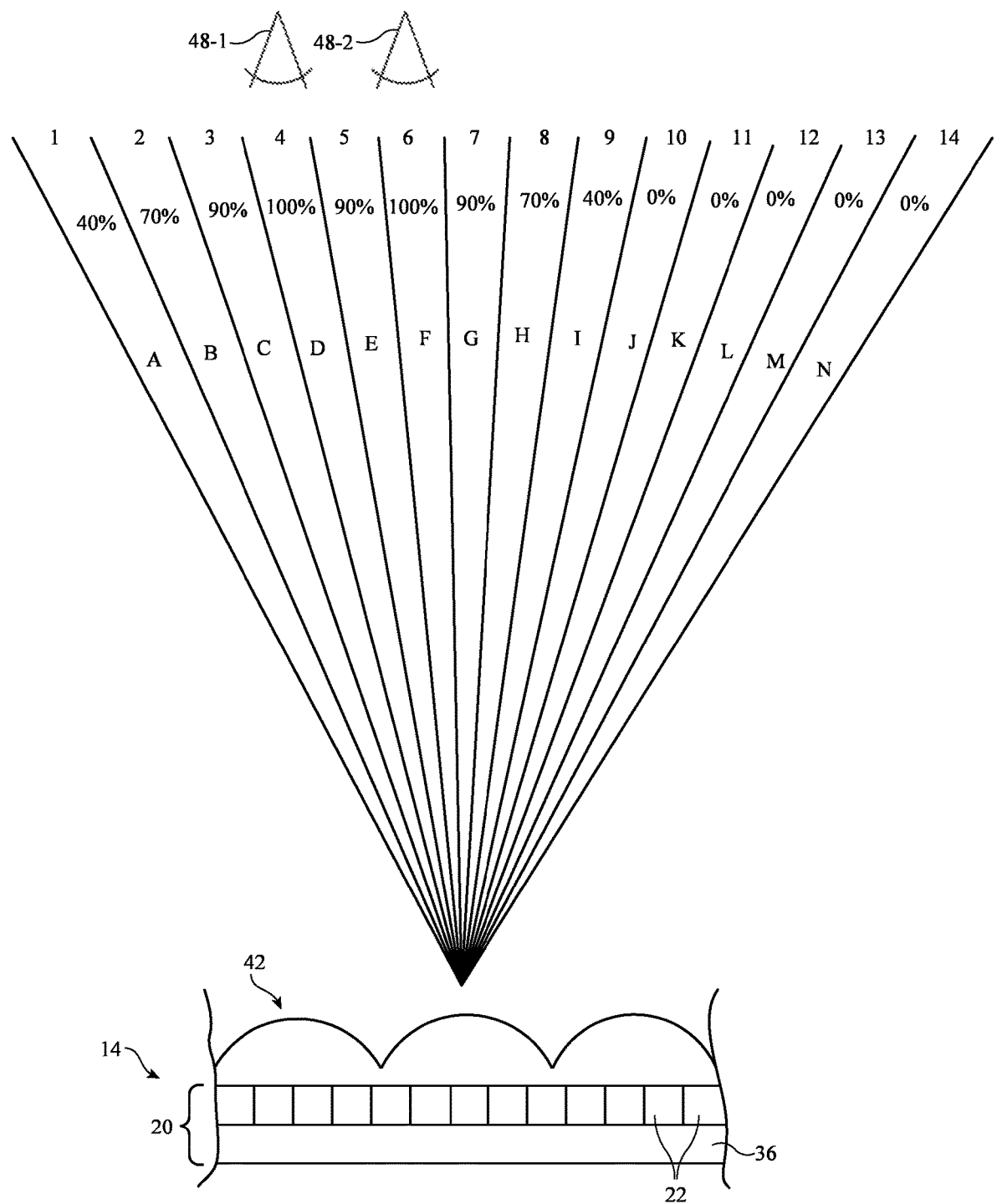
FIG. 10A is a side view of an illustrative display with unoccupied zones that have brightness levels that gradually decrease with increasing distance from the closest occupied zone in accordance with an embodiment.

As shown in FIG. 10A, eye 48-1 is in zone 4 and eye 48-2 is in zone 6. These zones therefore have full brightness (e.g., 100% brightness as indicated in FIG. 10A). With increasing distance from zone 6, the brightness level of the unoccupied zones drops. Zone 7 has a brightness level of 90%, zone 8 has a brightness level of 70%, and zone 9 has a brightness level of 40%. Further than zone 9 (e.g., zones 10-14), the unoccupied zones have a brightness level of 0%. The same brightness distribution is used adjacent to occupied zone 4 as well. Zone 3 has a brightness level of 90%, zone 2 has a brightness level of 70%, and zone 1 has a brightness level of 40%.

Figure 10B:
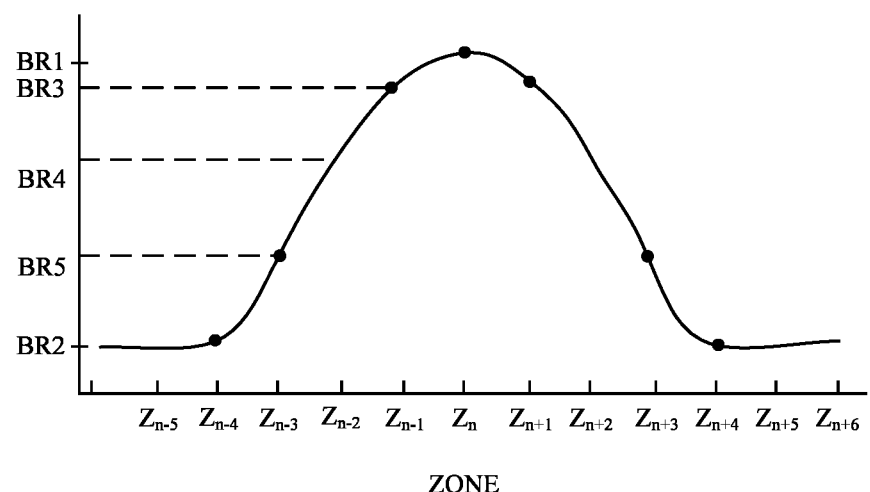
FIG. 10B is a graph of an illustrative gaussian function that may be used to determine zone brightness levels in accordance with an embodiment.

FIG. 10B is a graph of an illustrative brightness profile that may be used for the display zones. As shown in FIG. 10B, there may be a zone $Z_n$ where the viewer's eye is located. Zones are present on either side of zone $Z_n$ (e.g., $Z_{n-1}$, $Z_{n-2}$, $Z_{n-3}$, $Z_{n+1}$, $Z_{n+2}$, $Z_{n+3}$, etc.). In FIG. 10B, the brightness at zone $Z_n$ is BR1. This may be 100% (e.g., the maximum brightness the display is capable of) or some other desired peak brightness (e.g., a brightness determined to be appropriate for the real time lighting conditions of the display).

To either side of the occupied zone $Z_n$, the brightness decreases with increasing distance from zone $Z_n$. As shown, a brightness level of BR3 may be used one zone from the occupied zone (e.g., zones $Z_{n-1}$ and $Z_{n+1}$), a brightness level of BR4 may be used two zones from the occupied zone (e.g., zones $Z_{n-2}$ and $Z_{n+2}$), a brightness level of BR5 may be used three zones from the occupied zone (e.g., zones $Z_{n-3}$ and $Z_{n+3}$), and a brightness level of BR2 may be used more than three zones from the occupied zone (e.g., zones $Z_{n-4}$ and $Z_{n+4}$). In FIG. 10A, BR1 is 100%, BR2 is 0%, BR3 is 90%, BR4 is 70%, and BR5 is 40%.

This example is merely illustrative. Brightness levels BR1-BR5 may have any desired magnitudes. The brightness level BR1 may be 100% or less than 100%. Brightness level BR2 may be 0% or greater than 0%. In general, the brightness level may gradually decrease with increasing distance from the closest occupied zone. The brightness level may decrease monotonically with increasing distance from the closest occupied zone (as in FIG. 10B). At least one intermediate brightness level may be used between the peak brightness level (of the occupied zone) and the minimum brightness level (e.g., 0%). The brightness level may follow a profile having any desired shape (e.g., a gaussian profile).

Figure 11:
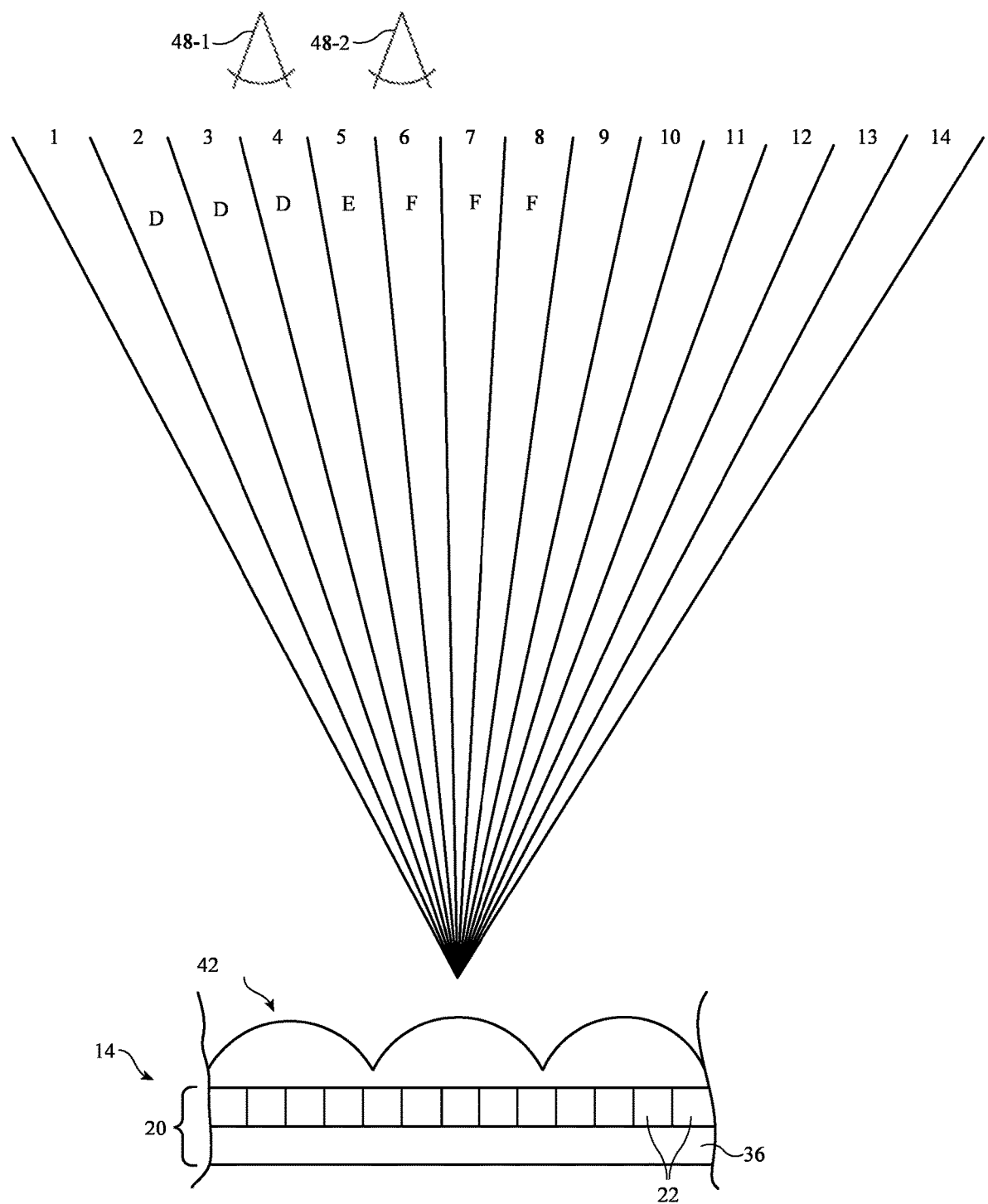
FIG. 11 is a side view of an illustrative display with images that are modified based on viewer eye position information in accordance with an embodiment.

In addition to using information from eye and/or head tracking system 18 to reduce power consumption, information from eye and/or head tracking system 18 may be used to increase sharpness in the display. FIG. 11 shows an arrangement of this type. In FIG. 11, similar to as shown in FIG. 10A, eye 48-1 is in zone 4 and eye 48-2 is in zone 6. Image D is presented in zone 4 and image F is presented in zone 6.

As previously mentioned, an image intended for a given viewing area may not be contained exclusively to that viewing zone. Crosstalk may occur between viewing zones within the display. To mitigate crosstalk, the images for unoccupied zones may be modified based on the viewer eye position. In FIG. 11, unoccupied zones 2 and 3 may display the same image as occupied zone 4 (image D). Consequently, if part of the zone 2 or zone 3 light leaks into zone 4, the light will correspond to the same image as in zone 4. This increases the perceived sharpness of the display to the viewer. Also in FIG. 11, unoccupied zones 7 and 8 may display the same image as occupied zone 6 (image F). Consequently, if part of the zone 7 or zone 8 light leaks into zone 6, the light will correspond to the same image as in zone 6.

In FIG. 11, each of zones 2-8 may emit light with full brightness (e.g., 100% brightness) and each of zones 1 and 9-14 may be turned off (e.g., 0% brightness). The unoccupied zones therefore follow a brightness profile similar to the step function of FIGS. 9A and 9B. This example is merely illustrative. If desired, a gradual brightness reduction scheme similar to as shown in FIGS. 10A and 10B may be used in FIG. 11.

Figure 12:
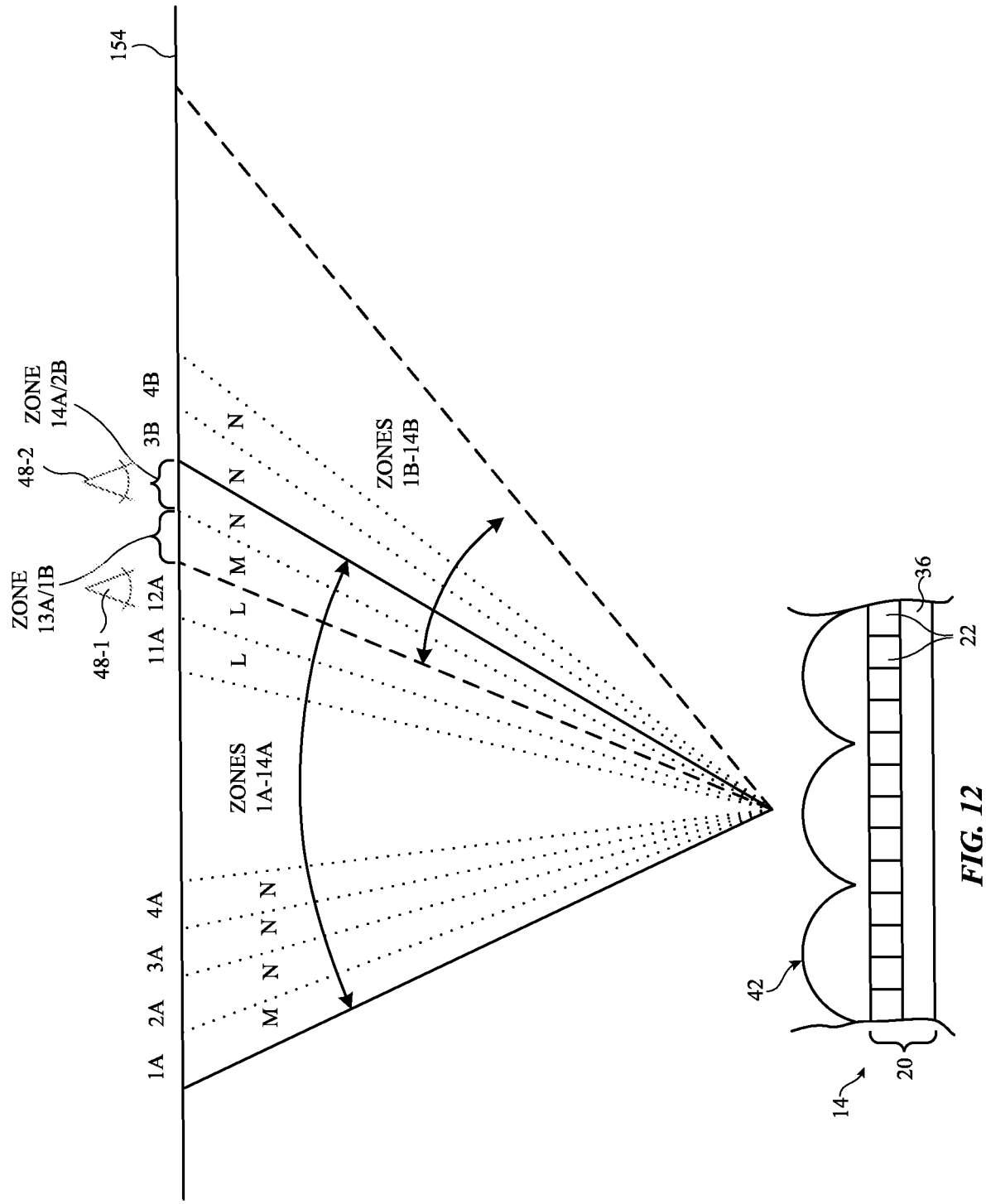
FIG. 12 is a side view of an illustrative display showing how a secondary viewing cone may be utilized based on viewer eye position information in accordance with an embodiment.

A similar concept as in FIG. 11 may be used to improve viewing at high viewing angles. FIG. 12 shows a display of this type. In FIGS. 6-11, display 14 is depicted as having fourteen distinct viewing zones that are each capable of displaying a respective unique image. Outside of the fourteen viewing zones, no additional viewing zones are shown. However, in some cases, a duplicate viewing zone may be present on one or both sides of the primary viewing zone.

For example, as shown in FIG. 12, there may be a primary viewing cone that includes zones 1A-14A. FIG. 12 shows an illustrative viewing plane 154. The center of the primary viewing cone is orthogonal to the surface of display 14. The viewing zones 1A-14A may be referred to as primary viewing zones. In addition, there may be a secondary viewing cone that is adjacent to the primary viewing cone and at an angle relative to the display. The secondary viewing cone includes zones 1B-14B. The viewing zones 1B-14B may be referred to as secondary viewing zones. Each secondary viewing zone is a duplicate of a primary viewing zone. For example, secondary viewing zone 1B displays the same image as primary viewing zone 1A, secondary viewing zone 2B displays the same image as primary viewing zone 2A, etc. The images displayed in the secondary viewing zones 1B-14B may be dimmer versions of the images displayed in primary viewing zones 1A-14A.

As shown in FIG. 12, the secondary viewing cone may at least partially overlap the primary viewing cone. Specifically, secondary viewing zone 1B overlaps with primary viewing zone 13A and secondary viewing zone 2B overlaps with primary viewing zone 14A. In some cases, this overlap may lead to undesirable cross-talk. However, using head tracking system 18, the known position of the viewer may be used to improve sharpness of the display.

In FIG. 12, eye 48-1 is in zone 12A and eye 48-2 is in zone 14A. Eye 48-1 may be intended to view image L from zone 12A and eye 48-2 may be intended to view image N from zone 14A. To improve sharpness, the adjacent, non-occupied zones may be modified to display the same image as the occupied zones. For example, zone 11A may display the same image as occupied zone 12A (image L). Consequently, if part of the zone 11A light leaks into zone 12A, the light will correspond to the same image as in zone 12A.

Zone 14A may display image N. Accordingly, zones 3A and 4A may also be used to display image N. This causes adjacent, non-occupied secondary zones 3B and 4B to display image N, improving the sharpness of the display. Similarly, zone 2A may be used to display image N. The secondary zone 2B that is a duplicate of zone 2A overlaps primary zone 14A. Displaying image N in zone 2A therefore ensures that image N is also displayed in zone 2B (which overlaps primary zone 14A also displaying image N). If zone 2A displayed a different image (e.g., image B), then a combination of image N and image B would be perceived by eye 48-2, resulting in an unclear image.

To summarize, secondary viewing zones may be leveraged to improve the sharpness of the display when head tracking indicates the viewer is viewing from a high viewing angle as in FIG. 12.

Figure 13:
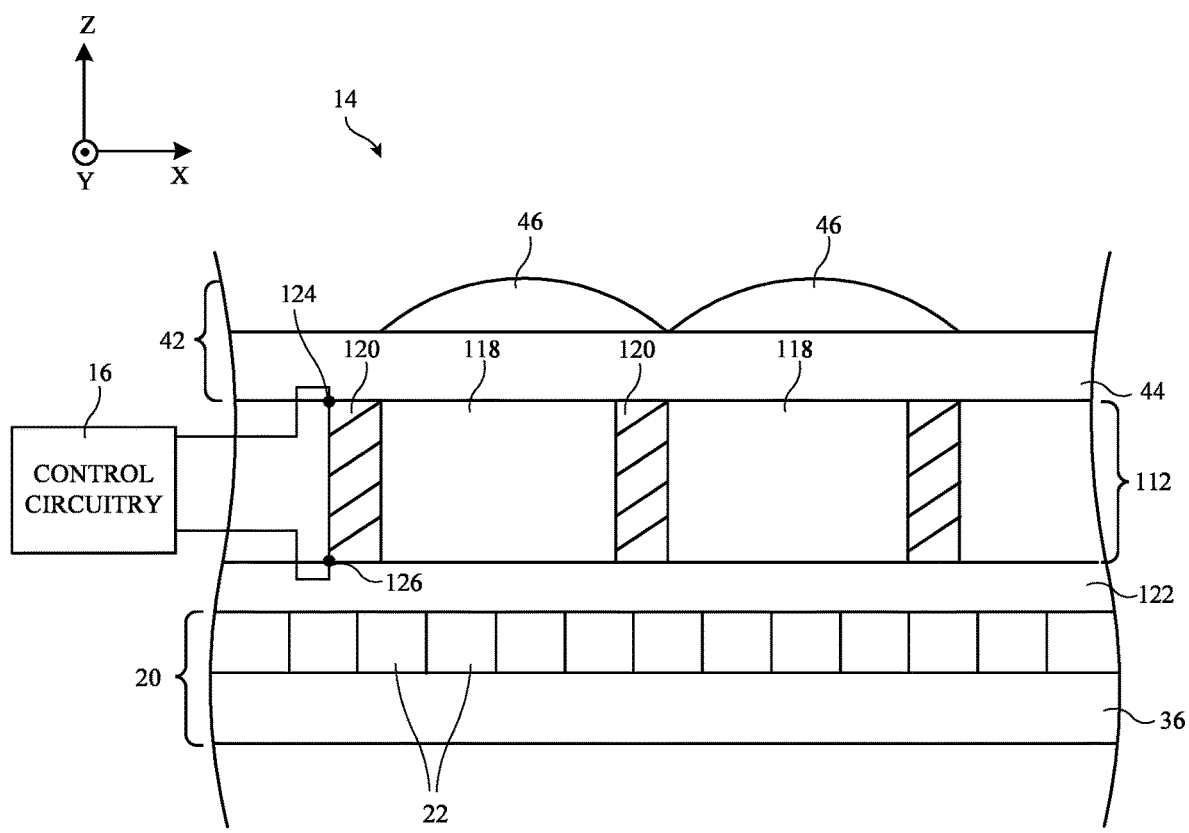
FIG. 13 is a cross-sectional side view of an illustrative display that includes a louver film in accordance with an embodiment.

Although in some cases the secondary viewing zones may be utilized to improve the display, in other cases the secondary viewing zones may result in undesirable crosstalk. To block crosstalk of this type, a louver film may optionally be incorporated into the display. FIG. 13 is a cross-sectional side view of a lenticular display with a louver film. As shown in FIG. 13, louver film 112 may be interposed between display panel 20 and lenticular lens film 42. The louver film may block light past certain viewing angles. This ensures that light corresponding to the optimal viewing angle is still emitted from the display (e.g., light for the primary cone and zones 1A-14A in FIG. 12). However, light outside of this area (e.g., light for the secondary viewing cones such as zones 1B-14B in FIG. 12) is blocked by louver film 112. Outside of the optimal field of view, the display will simply appear dark (off).

As shown in FIG. 13, display 14 includes pixels 22 on substrate 36. Substrate 36 may be formed from glass, metal, plastic, ceramic, or other substrate materials and pixels 22 may be organic light-emitting diode pixels, liquid crystal display pixels, or any other desired type of pixels. Lenticular lens film 42 may be formed over the display pixels. Lenticular lens film 42 includes lenses 46 and a base film portion 44.

The display of FIG. 13 also includes a polarizer 122 formed over display pixels 22. Polarizer 122 may be a linear polarizer (e.g., formed from layers of polyvinyl alcohol (PVA) and tri-acetate cellulose (TAC) or formed from other desired materials). Louver film 112 is interposed between polarizer 122 and lenticular lens film 42. The louver film includes both transparent portions 118 and opaque portions 120. The transparent portions of the louver film may be formed from a polymer material such as polycarbonate (PC), poly(methyl methacrylate) (PMMA), polyethylene terephthalate (PET), etc. The transparent portions of the louver film may be formed from other materials such as glass if desired. The transparent portions of the louver film may transmit more than 90% of light, more than 95% of light, more than 99% of light, etc.

Opaque portions 120 of the louver film may be formed from an opaque material. For example, the opaque portions may transmit less than 50% of light, less than 40% of light, less than 30% of light, less than 20% of light, less than 10% of light, less than 5% of light, less than 1% of light, etc. The opaque portions may be formed from an opaque polymer material or an opaque material of another type. The opaque portions may extend from an upper surface of the louver film to a lower surface of the louver film. Opaque portions 120 may sometimes be referred to as opaque walls. The opaque portions may be elongated parallel to the Y-axis, similar to the pattern for the lenticular lenses shown in FIG. 5. Each opaque portion may extend in the Y-direction across the entire display. In the event that the lenticular lenses extend diagonally across the display, the opaque walls may also extend diagonally parallel to the lenticular lenses.

Due to the presence of opaque portions 120, the angle of light emitted through transparent portions 118 is limited. The angle of emission through the louver film may be less than ±10°, less than ±15°, less than ±20°, less than ±30°, less than ±40°, between ±10° and ±30°, between ±10° and ±20°, etc. Because louver film 112 reduces the angle-of-emission and accordingly the viewing angle of the display, louver film 112 may sometimes be referred to as an angle-of-emission reduction layer 112, a viewing angle reduction layer 112, an emission angle reduction layer 112, etc. The louver film may also be referred to as privacy film 112.

The angle-of-emission reduction layer 112 shown in FIG. 13 is merely illustrative. Other arrangements may be used for the angle-of-emission reduction layer. For example, opaque portions 120 may be selectively opaque. The opaque portions 120 may optionally be switched between a transparent state and an opaque state. The opaque portions may only have two states (e.g., fully transparent and fully opaque) or may have additional states between the two extremes if desired. To switch the transparency of selectively opaque portions 120, control circuitry 16 may apply signals to contact 124 and/or contact 126. In one example, opaque portions 120 may be formed from a liquid crystal material. Control circuitry 16 may apply different voltages to electrodes on either side of the opaque portion (e.g., at contacts 124 and 126) to control the transparency of the opaque portions. In another example, the opaque portions may include electronic ink (e.g., negatively and positively charged black and white particles that are suspended in a clear fluid). Control circuitry may apply signals to contact 124 and/or contact 126 to change the opacity of selectively opaque portion 120 to control the emission angle of the display. This example is merely illustrative. The opacity of opaque portions 120 may be static instead of switchable if desired.

In another possible arrangement for the angle-of-emission reduction layer 112, the opaque walls may be incorporated into the base 44 of film 42. In yet another possible arrangement, lenticular lens film 46 may be interposed between display panel 20 and the angle-of-emission reduction layer 112 (e.g., the position of the lenticular lenses 46 and layer 112 may be flipped).

Figure 14:
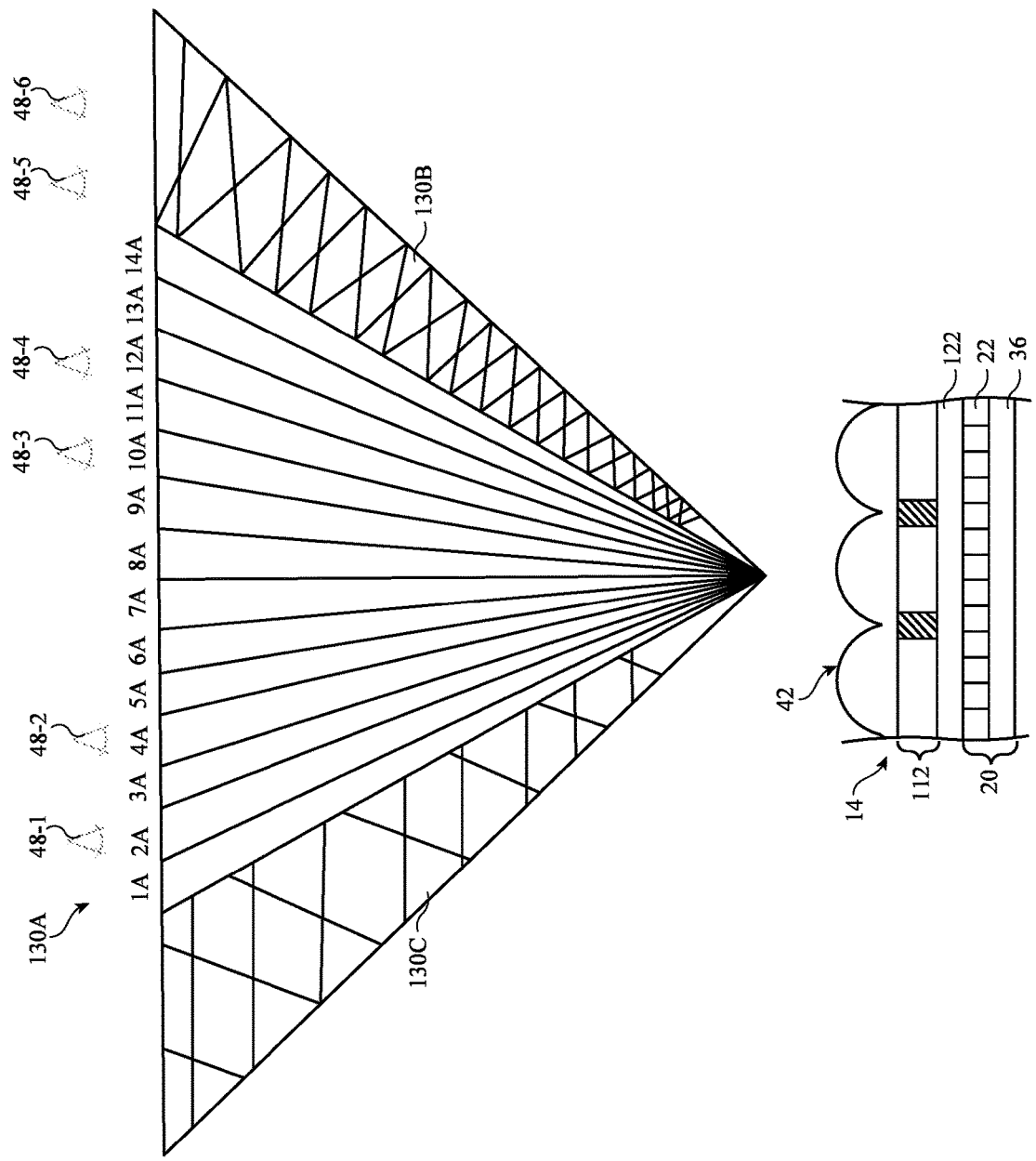
FIG. 14 is a side view of an illustrative display showing how a louver film may be used to block secondary viewing cones in accordance with an embodiment.

FIG. 14 is a diagram showing how the privacy film may be used to block secondary viewing cones in the display. As shown in FIG. 14, the secondary viewing cones 130B and 130C may be blocked by the opaque walls in louver film 112 in the display. The primary viewing cone (with zones 1A-14A) remains unblocked and available to present images to one or more viewers.

The louver film may block the secondary viewing cones when two viewers are viewing the display. Consider a scenario where a first viewer has a first eye 48-1 in zone 2A and a second eye 48-2 in zone 4A. A second viewer simultaneously has a first eye 48-3 in zone 10A and a second eye 48-4 in zone 12A. When there are two simultaneous viewers of the display, the louver film 112 is helpful for reducing crosstalk.

However, in another scenario, there may only be one viewer present with eyes 48-5 and 48-6 at a high viewing angle. In this type of scenario, the louver film 112 prevents light from reaching eyes 48-5 and 48-6. If the louver film 112 is switchable, the louver film may be switched to a transparent mode when there is a viewer at a high viewing angle.

When the display is updated based on the detected position of the viewer, changes may optionally be made gradually. For example, viewing zones that are turned on and off may fade in and fade out to avoid visible flickering. The control circuitry may gradually transition a zone between two desired brightness levels any time the brightness level changes.

Figure 15:
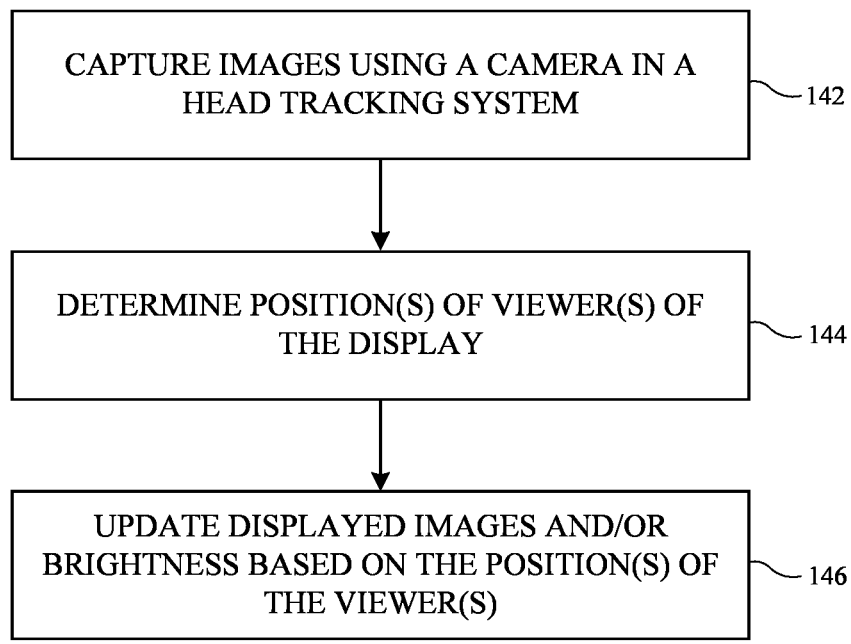
FIG. 15 is a flowchart showing illustrative method steps involved in operating an electronic device with a display and a head tracking system such as the electronic device of FIG. 6 in accordance with an embodiment.

FIG. 15 is a flowchart of illustrative method steps for operating an electronic device of the type shown in FIG. 6. At step 142, a camera (e.g., camera 54 in eye and/or head tracking system 18) may be used to capture images of an environment around the electronic display. In particular, the camera may capture images of an area in front of the display where a viewer of the display is expected to be present. The viewer of the display may be expected at distances greater than 1 foot from the display, greater than 2 feet from the display, greater than 3 feet from the display, greater than 5 feet from the display, greater than 10 feet from the display, etc.

At step 144, the position of one or more viewers of the display may be determined. Control circuitry such as control circuitry 16 may use the captured images from the camera to determine how many viewers are present and the positions of the viewers. Based on the captured images, the control circuitry may determine in which viewing zone each viewer eye is located. The gaze direction of the viewer need not be determined to identify which viewing zones the viewer eyes are located in. In other words, control circuitry 16 may, in some cases, use only the determined position of the user's eyes (e.g., in a plane in front of the display) for subsequent processing, and not the direction-of-gaze of the user's eyes.

Finally, at step 146, based on the determined positions of the viewer, the brightness of one or more zones and/or the image displayed by one or more zones may be updated. FIGS. 8A and 8B show how unoccupied zones may be turned off. FIGS. 9A-10B show how zone brightness levels may be modified based on viewer eye position to preserve power while avoiding latency artifacts. FIGS. 11 and 12 show examples where the images for one or more zones may be updated based on the determined viewer eye positions to increase display sharpness. In embodiments where the display includes a switchable louver film, the louver film may be switched between a transparent state and opaque state based on the identified viewer eye positions. For example, the control circuitry 16 may place the louver film in the opaque state when one or more viewers are present in a primary (on-axis) viewing position. The control circuitry 16 may place the louver film in the transparent state when one or more viewers are present in a high viewing angle position. The control circuitry 16 may gradually transition between brightness levels when switching brightness levels.

As described above, one aspect of the present technology is the gathering and use of information such as sensor information. The present disclosure contemplates that in some instances, data may be gathered that includes personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of information that may include personal information data to implement one or more various disclosed embodiments, the present disclosure also contemplates that the various embodiments can also be implemented without the need for accessing personal information data. That is, the various embodiments of the present technology are not rendered inoperable due to the lack of all or a portion of such personal information data.

The foregoing is merely illustrative and various modifications can be made to the described embodiments. The foregoing embodiments may be implemented individually or in any combination.

The invention claimed is:

1. An electronic device comprising a display with a plurality of independently controllable viewing zones, wherein the electronic device is configured to display three-dimensional content, and wherein the display comprises:
    an array of pixels;
    a lenticular lens film formed over the array of pixels; and
    control circuitry configured to display a same image in at least two adjacent independently controllable viewing zones of the plurality of independently controllable viewing zones, wherein the same image is based on the three-dimensional content.

2. The electronic device defined in claim 1, wherein the plurality of independently controllable viewing zones is distributed across a primary viewing cone.

3. The electronic device defined in claim 2, wherein the primary viewing cone has first and second opposing edges, wherein a first independently controllable viewing zone of the plurality of independently controllable viewing zones is adjacent to the first edge, wherein a second independently controllable viewing zone of the plurality of independently controllable viewing zones is adjacent to the second edge, wherein the control circuitry is configured to display a first additional image in the first independently controllable viewing zone and wherein the control circuitry is configured to display a second additional image in the second independently controllable viewing zone.

4. The electronic device defined in claim 3, wherein the at least two adjacent independently controllable viewing zones are interposed between the first and second independently controllable viewing zones.

5. The electronic device defined in claim 1, wherein each one of the plurality of independently controllable viewing zones has an associated viewing angle.

6. The electronic device defined in claim 5, wherein the viewing angle is between 0 degrees and 4 degrees.

7. The electronic device defined in claim 1, wherein the plurality of independently controllable viewing zones comprises more than 10 independently controllable viewing zones.

8. The electronic device defined in claim 1, wherein the control circuitry is configured to display the same image in three adjacent independently controllable viewing zones of the plurality of independently controllable viewing zones.

9. The electronic device defined in claim 1, further comprising:
    a camera configured to capture images, wherein control circuitry is configured to determine eye position the information from the captured images.

10. The electronic device defined in claim 9, wherein the control circuitry is configured to determine that one of the at least two adjacent independently controllable viewing zones is occupied based on the eye position information.

11. An electronic device comprising a display with a plurality of independently controllable viewing zones, wherein the display is configured to display a three-dimensional image and wherein the display comprises:
    an array of pixels;
    a lenticular lens film formed over the array of pixels; and
    control circuitry configured to, based on the three-dimensional image, display a same image in two non-adjacent independently controllable viewing zones of the plurality of independently controllable viewing zones.

12. The electronic device defined in claim 11, wherein there are multiple independently controllable viewing zones of the plurality of independently controllable viewing zones interposed between the two non-adjacent independently controllable viewing zones.

13. The electronic device defined in claim 11, wherein each one of the plurality of independently controllable viewing zones has an associated viewing angle.

14. The electronic device defined in claim 13, wherein the viewing angle is less than 5 degrees.

15. The electronic device defined in claim 11, wherein the plurality of independently controllable viewing zones comprises more than 10 independently controllable viewing zones.

16. The electronic device defined in claim 11, further comprising:
    a camera configured to capture images, wherein the control circuitry is configured to determine eye position information from the captured images.

17. The electronic device defined in claim 16, wherein the control circuitry is configured to determine that one of the two non-adjacent independently controllable viewing zones is occupied based on the eye position information.

18. An electronic device comprising:
    a display with an array of pixels and a lenticular lens film formed over the array of pixels, wherein the display has a plurality of independently controllable viewing zones, wherein the plurality of independently controllable viewing zones is distributed across a primary viewing cone, wherein there is a secondary viewing cone associated with the primary viewing cone that is a dimmer version of the primary viewing cone, wherein the primary viewing cone has first and second opposing sides, and wherein the secondary viewing cone at least partially overlaps the primary viewing cone along an edge of the primary viewing cone on the first side; and
    control circuitry configured to:
        display an image in a first independently controllable viewing zone that is on the first side of the primary viewing cone; and
        display the image in a second independently controllable viewing zone that is on the second side of the primary viewing cone, wherein the secondary viewing cone includes a duplicate version of the first independently controllable viewing zone and wherein the duplicate version of the first independently controllable viewing zone overlaps the second independently controllable viewing zone.

19. The electronic device defined in claim 18, further comprising:
    a camera configured to capture images, wherein the control circuitry is configured to determine eye position information from the captured images.

20. The electronic device defined in claim 19, wherein the control circuitry is configured to display the image in the first independently controllable viewing zone based on the eye position information.

* * * * *

UNITED STATES PATENT AND TRADEMARK OFFICE
CERTIFICATE OF CORRECTION

PATENT NO. : 12,348,704 B2
APPLICATION NO. : 18/355774
DATED : July 1, 2025
INVENTOR(S) : Yi-Pai Huang et al.

Page 1 of 1

It is certified that error appears in the above-identified patent and that said Letters Patent is hereby corrected as shown below:

In the Claims

Column 19, Line 47, "wherein control" should read -- wherein the control --

Column 19, Lines 48-49, "eye position the information" should read -- eye position information --

Signed and Sealed this
Nineteenth Day of August, 2025

Coke Morgan Stewart
*Acting Director of the United States Patent and Trademark Office*